(12) United States Patent
Yang et al.

(10) Patent No.: US 11,812,689 B2
(45) Date of Patent: Nov. 14, 2023

(54) RIDING LAWN MOWER HAVING DIFFERENT STARTING MODES

(71) Applicant: Nanjing Chervon Industry Co., Ltd., Nanjing (CN)

(72) Inventors: Dezhong Yang, Nanjing (CN); Zhongyan Hou, Nanjing (CN); Jicun Cai, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 17/695,231

(22) Filed: Mar. 15, 2022

(65) Prior Publication Data

US 2022/0201932 A1 Jun. 30, 2022

Related U.S. Application Data

(63) Continuation of application No. PCT/CN2020/124287, filed on Oct. 28, 2020.

(30) Foreign Application Priority Data

Oct. 29, 2019 (CN) .......................... 201911034246.X
Oct. 29, 2019 (CN) .......................... 201911034247.4
(Continued)

(51) Int. Cl.
*A01D 34/68* (2006.01)
*A01D 34/00* (2006.01)
*A01D 34/06* (2006.01)

(52) U.S. Cl.
CPC ....... *A01D 34/6818* (2013.01); *A01D 34/006* (2013.01); *A01D 34/68* (2013.01);
(Continued)

(58) Field of Classification Search
CPC ........ A01D 69/00; A01D 69/02; A01D 34/64; A01D 34/6843; A01D 34/6818;
(Continued)

(56) References Cited

U.S. PATENT DOCUMENTS 8,543,295 B2 9/2013 Bryant et al.
9,867,331 B1 * 1/2018 Siudyla .................. A01D 34/76
(Continued)

FOREIGN PATENT DOCUMENTS

CN 102092279 A 6/2011
CN 203126834 U 8/2013
(Continued)

OTHER PUBLICATIONS

ISA/CN, Written Opinion issued on PCT application No. PCT/CN2020/124287, dated Jan. 27, 2021, 4 pages.
(Continued)

*Primary Examiner* — Adam J Behrens
(74) *Attorney, Agent, or Firm* — Greenberg Traurig, LLP

(57) ABSTRACT

A riding lawn mower includes a power output assembly including a mowing element, a cutting motor for driving the mowing element to move, and a cutting control module for controlling the cutting motor; a walking assembly including a walking wheel, a walking motor for driving the walking wheel to travel, and a walking control module for controlling the walking motor; and a first operating component configured to set starting modes of the walking motor. The first operating component has a first operating state configured to start the walking motor in a first starting mode, and a second operating state configured to start the walking motor in a second starting mode. In the first starting mode, the walking motor starts at a first starting acceleration. In the second
(Continued)

starting mode, the walking motor starts at a second starting acceleration. The second starting acceleration is greater than the first starting acceleration.

19 Claims, 18 Drawing Sheets

(30) Foreign Application Priority Data

Oct. 29, 2019 (CN) .......................... 201911034248.9
Jul. 24, 2020 (CN) .......................... 202010719948.8

(52) U.S. Cl.
CPC .......... *A01D 34/6812* (2013.01); *A01D 34/06* (2013.01); *A01D 2034/6843* (2013.01)

(58) Field of Classification Search
CPC ................ A01D 34/69; A01D 34/6812; A01D 34/6806; A01D 34/68; A01D 34/006; A01D 2101/00; A01D 2034/6825
See application file for complete search history.

(56) References Cited

U.S. PATENT DOCUMENTS

| | | | |
|---|---|---|---|
| 10,058,031 B1 | 8/2018 | Brown et al. | |
| 10,919,463 B1* | 2/2021 | Brown | B62D 11/04 |
| 2003/0080704 A1 | 5/2003 | Wakitani | |
| 2012/0136539 A1* | 5/2012 | Bryant | B60K 28/16 |
| | | | 701/42 |
| 2016/0183451 A1 | 6/2016 | Conrad et al. | |
| 2017/0142898 A1* | 5/2017 | Bejcek | A01D 34/006 |
| 2019/0178219 A1 | 6/2019 | Koenen | |

FOREIGN PATENT DOCUMENTS

| | | | | |
|---|---|---|---|---|
| CN | 103350725 | A | 10/2013 | |
| CN | 103813918 | A | 5/2014 | |
| CN | 203646075 | U | 6/2014 | |
| CN | 104228586 | A | 12/2014 | |
| CN | 104553886 | A | 4/2015 | |
| CN | 204942342 | U | 1/2016 | |
| CN | 108528271 | A | 9/2018 | |
| CN | 109552283 | A | 4/2019 | |
| CN | 208759495 | U | 4/2019 | |
| CN | 110059095 | A | 7/2019 | |
| CN | 110116730 | A | 8/2019 | |
| CN | 209710730 | U | 12/2019 | |
| CN | 209710732 | U | 12/2019 | |
| DE | 102012100541 | A1 * | 7/2013 | ......... A01D 34/6806 |
| JP | 2011188780 | A | 9/2011 | |
| JP | 2012011823 | A | 1/2012 | |
| JP | 2014045637 | A | 3/2014 | |
| WO | 2019/238043 | A1 | 12/2019 | |
| WO | WO-2019241214 | A1 * | 12/2019 | ........... A01D 34/008 |

OTHER PUBLICATIONS

ISA/CN, International Search Report issued on PCT application No. PCT/CN2020/124287, dated Jan. 27, 2021, 4 pages.
ISA/CN, English translation of International Search Report issued on PCT application No. PCT/CN2020/124287, dated Jan. 27, 2021, 2 pages.
ISA/CN, English translation of Written Opinion issued on PCT application No. PCT/CN2020/124287, dated Jan. 27, 2021, 6 pages.
EPO, extended European search report issued on European patent application No. 20882832.7, dated Oct. 7, 2022, 7 pages.
EPO, extended European search report issued on European patent application No. 20908666.9, dated Dec. 6, 2022, 8 pages.
ISA/CN, English translation of International Search Report issued on PCT application No. PCT/CN2020/071419, dated Sep. 27, 2020, 3 pages.
ISA/CN, International Search Report issued on PCT application No. PCT/CN2020/071419, dated Sep. 27, 2020, 5 pages.
ISA/CN, Written Opinion issued on PCT application No. PCT/CN2020/071419, dated Sep. 27, 2020, 4 pages.
ISA/CN, English translation of Written Opinion issued on PCT application No. PCT/CN2020/071419, dated Sep. 27, 2020, 3 pages.

* cited by examiner

RIDING LAWN MOWER HAVING DIFFERENT STARTING MODES

RELATED APPLICATION INFORMATION

This application is a continuation of International Application Number PCT/CN2020/124287, filed on Oct. 28, 2020, through which this application also claims the benefit under 35 U.S.C. § 119(a) of Chinese Patent Application No. 201911034247.4, filed on Oct. 29, 2019, Chinese Patent Application No. 201911034246.X, filed on Oct. 29, 2019, Chinese Patent Application No. 201911034248.9, filed on Oct. 29, 2019, and Chinese Patent Application No. 202010719948.8, filed on Jul. 24, 2020, all of which are incorporated herein by reference in their entirety.

BACKGROUND

A riding lawn mower configured with only one operation mode, such as, only one starting mode, cannot meet a user's need when the user needs to start up quickly, because of the fixed starting acceleration.

SUMMARY

An example provides a riding lawn mower, including: a power output assembly, including a mowing element, a cutting motor that drives the mowing element to move, and a cutting control module that controls the cutting motor; a walking assembly including a walking wheel, a walking motor for driving the walking wheel to travel, and a walking control module that controls the walking motor; an operating component, including an operating mechanism, an operation sensing module capable of sensing changes in the state of the operating mechanism; a power supply assembly, at least for providing power for the cutting motor and the walking motor; the power supply assembly includes a power management module; a bus module connected with the cutting control module, the walking control module, the operation sensing module, and the power supply management module to transmit data among the cutting control module, the walking control module, the operation sensing module, and the power supply management module.

In one example, the riding lawn mower further includes: a chassis made of metal materials and negative terminals of the cutting control module, the walking control module, and the power supply management module are connected to the chassis.

In one example, the negative terminals of the cutting control module, the walking control module, and the power supply management module are connected to the chassis through screw fasteners.

In one example, the riding lawn mower further includes: a metal plate arranged under at least one of the cutting control module, the walking control module, and the power supply management module and negative terminals of at least one of the cutting control module, the walking control module, and the power supply management module are connected to the metal plate.

In one example, the riding lawn mower further includes: at least one circuit board configured to mount the cutting control module, the walking control module, the power supply management module, the operation sensing module, and the bus module and the circuit board is arranged under the seat.

In one example, the riding lawn mower further includes: a plurality of circuit boards respectively configured to mount the cutting control module, the walking control module, the power supply management module, the operation sensing module, and the bus module and each of the plurality of circuit boards is arranged separately.

In one example, the riding lawn mower further includes: a cover detachably arranged on a one of the plurality of circuit boards, and the cover is configured as a semi-open structure.

In one example, at least one of the cutting control module, the walking control module, the operation sensing module, the power supply management module, and the bus module is provided with an interface group.

In one example, the interface group is provided with a plurality of interfaces, and the plurality of interfaces are configured to connect different wires.

In one example, the riding lawn mower further includes: a first heat sink arranged close to the cutting control module and/or the walking control module and facing a ground.

In one example, the first heat sink includes a plurality of cooling fins; the plurality of cooling fins are vertically arranged at the bottom of the cutting control module and/or the walking control module; and the cooling fins are arranged in parallel with a front and rear direction of the riding lawn mower.

In one example, the riding lawn mower further includes: a second heat sink arranged close to the power supply management module and facing a front of the riding lawn mower.

In one example, the second heat sink includes a plurality of cooling fins; the plurality of cooling fins are vertically arranged on the bottom of the power supply management module and face the front of the riding lawn mower; and the plurality of cooling fins are arranged substantially parallel to an up and down direction of the riding lawn mower.

In one example, the operating mechanism includes an operating lever, which can be pushed to different positions to issue different control commands and the operation sensing module includes a position sensor, which is connected to the bus module for detecting the position of the operating lever and sending detected data to the bus module.

In one example, the operating mechanism further includes at least one switch, which is enabled to be triggered to change states to set the riding lawn mower in different target states and the operation sensing module includes a switch state detection assembly, which is connected to the bus module, and configured to detect the state of the at least one switch and send detected data to the bus module.

In one example, the lawn mower further includes a lighting assembly configured to provide an illuminating function; the lighting assembly including an illuminating light; and a lighting control module configured to control an operation of the lighting assembly, and the lighting control module is connected to the bus module.

An example provides a riding lawn mower, including: a power output assembly including a mowing element, a cutting motor for driving the mowing element to move, and a cutting control module for controlling the cutting motor; a walking assembly including a walking wheel, a walking motor for driving the walking wheel to travel, and a walking control module for controlling the walking motor; and a first operating component configured to set a plurality of starting modes of the walking motor, the first operating component having: a first operating state configured to start the walking motor in a first starting mode, in the first starting mode, the walking motor starts at a first starting acceleration; and a second operating state configured to start the walking motor in a second starting mode, in the second starting mode, the walking motor starts at a second starting acceleration; wherein the second starting acceleration is greater than the first starting acceleration.

In one example, the first operating component also has: a third operating state configured to start the walking motor in a third starting mode, and in the third starting mode, the walking motor starts at a third starting acceleration; wherein the third starting acceleration is greater than the second starting acceleration.

In one example, the riding lawn mower further includes: a power supply assembly configured to provide electric energy for the walking motor and, when the power supply assembly supplies a first amount of power, the walking motor starts at the first starting acceleration in the first starting mode and the walking motor starts at the second starting acceleration in the second starting mode and, when the power supply assembly supplies a second amount of power, the walking motor starts at a third starting acceleration in the first starting mode and the walking motor starts at a fourth starting acceleration in the second starting mode and wherein the first starting acceleration is different from the third starting acceleration, and the second starting acceleration is different from the fourth starting acceleration.

In one example, the riding lawn mower further includes: a second operating component configured to send a start signal to start the walking motor and the walking control module is configured to: in response to the start signal, start the walking motor according to the starting mode corresponding to the operating state of the first operating component.

In one example, the first operating component is also configured to set a plurality of braking modes of the walking motor; the first operating component also has: a fourth operating state configured to brake the walking motor in a first braking mode, and in the first braking mode, the walking motor brakes with a first braking acceleration; and a fifth operating state configured to brake the walking motor in a second braking mode, and in the second braking mode, the walking motor brakes with a second braking acceleration; and wherein the second braking acceleration is different from the first braking acceleration.

In one example, the riding lawn mower further includes: a second operating component configured to send a brake signal to brake the walking motor and the walking control module is configured to: in response to the start signal, start the walking motor according to the starting mode corresponding to the operating state of the first operating component; and, in response to the brake signal, brake the walking motor according to the braking mode corresponding to the operating state of the first operating component.

In one example, the riding lawn mower further includes: a third operating component configured to make the riding lawn mower enter a ready state and the third operating component includes: a first trigger configured to power on the cutting control module; and a second trigger configured to start the walking motor; wherein the walking control module is configured to: in response to the first trigger being triggered and the second trigger being triggered, control the walking motor to start.

In one example, the walking control module is configured to: during a walking process of the riding lawn mower, if the first trigger is not triggered, control the walking motor to power off, or control the walking motor to brake and then power off.

In one example, the walking control module is configured to: during a walking process of the riding lawn mower, if the second trigger is triggered, control the walking motor to remain in a current state, or control the walking motor to power off, or control the walking motor to brake and then power off.

In one example, a fourth operating component enabled to set or change a speed gear of the walking motor; the walking control module is configured to: in response to the walking motor rotating, control the fourth operating component to lose a function of setting or changing the speed gear of the walking motor.

In one example, the riding lawn mower further includes: a fourth operating component configured to set or change a speed gear of the walking motor and the walking control module is configured to: in response to the fourth operating component being operated, control the walking motor to stop rotating.

In one example, the riding lawn mower further includes: an operation panel, including a first button and a second button and the first button is configured to control a first function; when the first button is pressed, the first function is activated; the second button is configured to control a second function; when the second button is pressed, the second function is activated; when both the first button and the second button are pressed, a third function is activated, and the third function is different from the first function and the second function.

In one example, the third function is for adjusting a maximum output rotational speed of the walking motor.

In one example, the riding lawn mower further includes: a power supply assembly, the power supply assembly including a plurality of battery packs; and a charging interface for connecting an external power source to charge the plurality of battery packs; wherein the charging interface includes: a charging sensing module having a first state and a second state, and configured to sense whether the external power source is connected; in the first state, the external power source is connected to the charging interface; in the second state, the external power source is not connected to the charging interface; wherein the walking control module is configured to: in response to the charging sensing module in the first state, control the walking motor to slow down.

In one example, the riding lawn mower further includes: a cutting control module for controlling an operation of the cutting motor; wherein the cutting control module is configured to: in response to the charging sensing module in the first state, control the cutting motor to slow down.

In one example, the riding lawn mower further includes: a power supply assembly for supplying electric energy to the walking motor, the power supply assembly including a rechargeable battery pack; and a feedback circuit for feeding electric energy of the walking motor during a braking process of the walking motor back to the power supply assembly.

In one example, the feedback circuit includes: a power supply voltage detection module configured to detect a voltage of the battery pack; wherein the walking control module is configured to: obtain the voltage detected by the power supply voltage detection module; in response to the detected voltage being greater than or equal to a predefined threshold, cut off an electrical connection between the walking motor and the battery pack.

In one example, the walking control module is configured to: in response to cutting off the electrical connection between the walking motor and the battery pack, short-circuit windings of the walking motor.

In one example, the riding lawn mower further includes: a power supply current detection module configured to detect whether current flows from the walking motor to the power supply assembly; and a power supply voltage detection module configured to detect a voltage of the power supply assembly; wherein the walking control module is configured to: obtain the voltage detected by the power supply voltage detection module; determine whether current flows from the walking motor to the battery pack; in response to the detected voltage being greater than or equal to a predefined threshold, and current flowing from the walking motor to the battery pack, cut off an electrical connection between the walking motor and the battery pack.

In one example, the walking control module is configured to: in response to cutting off the electrical connection between the walking motor and the battery pack, short-circuit windings of the walking motor.

An example provides a riding lawn mower, including: an operating component for sending a parking signal to trigger the riding lawn mower to enter a parking mode; a power output assembly including a mowing element and a first motor for driving the mowing element to move; a walking assembly, including a walking assembly including a walking wheel, a walking motor for driving the walking wheel to travel; a control module, the control module is configured to: in response to the parking signal, determine whether a rotational speed of the walking motor is less than or equal to a predefined speed threshold; after determining that the rotational speed of the walking motor is less than or equal to the predefined speed threshold, apply a first torque opposite to a tendency of rotation of the walking motor to the walking motor, and the first torque is configured to enable the riding lawn mower to stand still in a position.

In one example, the first torque and a torque of an external force of the riding lawn mower that causes the riding lawn mower to have a tendency to slide are of a same magnitude and opposite directions.

In one example, the riding lawn mower further includes: a power supply assembly for providing electrical energy for the walking motor and the control module is configured to: in response to the rotational speed of the walking motor being less than or equal to the predefined speed threshold, control the power supply assembly to output a first current to the walking motor, and the first current enables the walking motor to generate the first torque.

In one example, the walking motor includes a rotor; the riding lawn mower further includes: a rotor position detection module configured to detect a position of the rotor of the walking motor; the control module is configured to: in response to the rotational speed of the walking motor being less than or equal to the predefined speed threshold, select a current position of the rotor of the walking motor as a reference position; in response to a state in which the rotor deviates from the reference position, control the power supply assembly to output the first current to the walking motor so that the walking motor generates the first torque, and the first torque makes the rotor of the walking motor return to the reference position.

In one example, the operating component is further configured to send an acceleration signal to trigger the riding lawn mower to exit the parking mode; the control module is configured to: in response to the acceleration signal, determine whether a direction of a second torque to be generated by the walking motor corresponding to the acceleration signal is the same as a direction of the first torque; if the direction of the second torque is the same as the direction of the first torque, then determine whether the second torque is greater than or equal to the first torque; if it is determined that the second torque is greater than or equal to the first torque, control the riding lawn mower to exit the parking mode.

In one example, if the direction of the second torque is opposite to the direction of the first torque, control the riding lawn mower to exit the parking mode.

In one example, the operating component is further configured to set a target speed and direction of the walking motor; the control module is configured to: in response to an end of the parking mode, control the walking motor to run at the target speed and direction according to the target speed and direction set by the operating component.

In one example, the operating component includes: an operating lever enabled to be pushed to a parking position to send the parking signal, and away from the parking position to send the acceleration signal; the control module is configured to: if the direction of the second torque is opposite to the direction of the first torque, and a change of position of the operating lever away from the parking position reaches a predefined threshold, control the riding lawn mower to exit the parking mode.

In one example, the riding lawn mower further includes: a brake pedal used to trigger the brake of the walking motor of the riding lawn mower and a signal switch coupled with the brake pedal and to be triggered by the brake pedal to send the parking signal.

In one example, the riding lawn mower further includes: a power detection module configured to detect a remaining power of the power supply assembly; wherein the control module is enabled to receive a signal detected by the power detection module, and the control module is further configured to: in response to the remaining power of the power supply assembly being lower than a predefined power threshold, control the walking motor to brake.

In one example, the control module is configured to: in response to the remaining power of the power supply assembly being lower than a predefined power threshold, short-circuit windings of the walking motor.

In one example, the riding lawn mower further includes: a key socket for inserting a key to start the riding lawn mower; wherein the control module is configured to: in response to the key being pulled out of the key socket, cut off an electrical connection between the power supply assembly and the walking motor so as to allow the walking motor to decelerate freely.

In one example, the riding lawn mower further includes: a seat; a seat trigger having a first state and a second state and, when the seat trigger is in the first state, the seat bears a weight greater than a first predefined weight, when the seat trigger is in the second state, the seat bears a weight less than a second predefined weight; wherein the control module is configured to: when the seat trigger changes from the first state to the second state, control the walking motor to brake.

In one example, the first predefined weight is greater than or equal to the second predefined weight.

In one example, the control module is configured to: when the seat trigger is changed from the first state to the second state and the time period in the second state is less than a predefined time period, control the walking motor to delay braking.

An example provides a control method of a riding lawn mower, the riding lawn mower including: a power output assembly including a mowing element and a first motor for driving the mowing element to move; a walking assembly, including a walking assembly including a walking wheel, a walking motor for driving the walking wheel to travel; an operating component for sending a parking signal to trigger the riding lawn mower to enter a parking mode; the control method of the riding lawn mower includes: in response to the parking signal, determine whether a rotational speed of the walking motor is less than or equal to a predefined speed threshold; after determining that the rotational speed of the walking motor is less than or equal to the predefined speed threshold, apply a first torque opposite to a tendency of rotation of the walking motor to the walking motor, and the first torque is configured to enable the riding lawn mower to stand still in a position.

In one example, the first torque and a torque of an external force of the riding lawn mower that causes the riding lawn mower to have a tendency to slide are of a same magnitude and opposite directions.

In one example, the operating component is further configured to send an acceleration signal to trigger the riding lawn mower to exit the parking mode; the control method of the riding lawn mower further includes: in response to the acceleration signal, determine whether a direction of a second torque to be generated by the walking motor corresponding to the acceleration signal is the same as a direction of the first torque; if the direction of the second torque is the same as the direction of the first torque, then determine whether the second torque is greater than or equal to the first torque; if it is determined that the second torque is greater than or equal to the first torque, control the riding lawn mower to exit the parking mode.

In one example, if the direction of the second torque is opposite to the direction of the first torque, directly control the riding lawn mower to exit the parking mode.

In one example, the operating component is further configured to set a target speed and direction of the walking motor; the control method of the riding lawn mower further includes: in response to an end of the parking mode, control the walking motor to run at the target speed and direction according to the target speed and direction set by the operating component.

In one example, the operating component includes: an operating lever enabled to be pushed to a parking position to send the parking signal, and away from the parking position to send the acceleration signal; the control method of the riding lawn mower further includes: if a change of position of the operating lever away from the parking position reaches a predefined threshold, control the riding lawn mower to exit the parking mode.

An example provides a riding lawn mower, including: a chassis; a power supply assembly for providing electrical energy to the riding lawn mower; a walking assembly including a walking wheel and a walking motor that drives the walking wheel to walk; an operating component, when triggered by the user, sends out an automatic parking signal to trigger the riding lawn mower to enter the automatic parking mode; a detection device for detecting an operating parameter of the walking motor when the riding lawn mower is in the automatic parking mode; a brake assembly for at least mechanical braking to prevent the walking wheel from moving relative to the chassis; the brake assembly outputs the brake signal when triggered by the user; and an alarm assembly configured to issue an alarm to remind the user; wherein the control module is configured to: receive the automatic parking signal to make the riding lawn mower in the automatic parking mode; when the riding lawn mower is in the automatic parking mode and the brake signal is not received, determine whether the operating parameter of the walking motor is greater than a predefined threshold value; if the operating parameter of the walking motor is greater than the predefined threshold value, control the alarm assembly to issue an alarm.

In one example, the control module is configured to: in response to the alarm assembly issuing an alarm, determine whether the brake signal is received; and in response to the received brake signal, control the alarm assembly to dismiss the alarm.

In one example, the control module is configured to: determine whether the riding lawn mower is in the automatic parking mode for a time greater than or equal to a predefined period of time; in response to the riding lawn mower being in the automatic parking mode for a time greater than or equal to the predefined period of time, and the brake signal is received, control the riding lawn mower to enter the sleep mode.

In one example, the riding lawn mower further includes: an interactive interface at least for displaying the remaining power of the power supply assembly; the power supply assembly continuously supplies power to the interactive interface when the riding lawn mower is in the sleep mode.

In one example, the operating component includes: an operating lever enabled to be pushed to a parking position to send the parking signal, an operation sensing module for detecting the position of the operating lever, and sending out the automatic parking signal when the operating lever is in the automatic parking position to trigger the riding lawn mower to enter the automatic parking mode.

In one example, the riding lawn mower further includes: a seat for the user to sit on, supported by the chassis, including a seat base and a seat back; the operating component includes: a weight sensor, which is arranged under the seat base and/or the seat back to generate a first signal or a second signal according to the weight of the user when the user is seated.

In one example, the weight sensor sends a first signal to the control module in response to the sensed weight being greater than or equal to a predefined weight value to allow the riding lawn mower to start; in response to the weight sensed being less than the predefined weight value, the weight sensor sends a second signal to the control module to prohibit the riding lawn mower from starting.

In one example, during the operation process of the riding lawn mower, the weight sensor sends an automatic parking signal to trigger the riding lawn mower in response to the weight sensed being less than the predefined weight value to enter the automatic parking mode.

In one example, the brake assembly includes: a brake pedal for the user to step on; a signal switch coupled with the brake pedal to be locked and output the brake signal when the brake pedal is stepped on to a predefined position.

In one example, the detection device is configured to detect an output torque of the walking motor of the riding lawn mower in the automatic parking mode; the control module is configured to: determine whether the riding lawn mower is in the automatic parking mode; in response to the riding lawn mower in the automatic parking mode, and the brake signal is not received, determine if the output torque of the walking motor is greater than a predefined torque threshold; if the torque of the walking motor is greater than the predefined torque threshold, control the alarm assembly to issue an alarm.

In one example, the detection device is configured to detect the first current output by the power supply assembly to the walking motor when the riding lawn mower is in the automatic parking mode; the control module is configured to: determine whether the riding lawn mower is in the automatic parking mode; in response to the riding lawn mower in the automatic parking mode and not receiving the brake signal, determine whether the first current is greater than a predefined current value; when the first current is greater than the predefined current value, control the alarm assembly to issue an alarm.

An example provides a control method of a riding lawn mower, the riding lawn mower including: a power supply assembly for providing electrical energy to the riding lawn mower; a walking assembly including a walking wheel and a walking motor that drives the walking wheel to walk; an operating component, when triggered by the user, sends out an automatic parking signal to trigger the riding lawn mower to enter the automatic parking mode; a detection device for detecting an operating parameter of the walking motor when the riding lawn mower is in the automatic parking mode; a brake assembly for at least mechanical braking to prevent the walking wheel from moving relative to the chassis; the brake assembly outputs the brake signal when triggered by the user; and an alarm assembly configured to issue an alarm to remind the user; wherein the control method is configured to: receive the automatic parking signal to make the riding lawn mower in the automatic parking mode; when the riding lawn mower is in the automatic parking mode and the brake signal is not received, determine whether the operating parameter of the walking motor is greater than a predefined threshold value; if the operating parameter of the walking motor is greater than the predefined threshold value, control the alarm assembly to issue an alarm. In response to the alarm assembly issuing an alarm, determine whether the brake signal is received; and in response to the received brake signal, control the alarm assembly to dismiss the alarm. Determine whether the riding lawn mower is in the automatic parking mode for a time greater than or equal to a predefined period of time; in response to the riding lawn mower being in the automatic parking mode for a time greater than or equal to the predefined period of time, and the brake signal is received, control the riding lawn mower to enter the sleep mode.

In one example, the control method further includes: in response to the riding lawn mower in the automatic parking mode, and the brake signal is not received, determine if the output torque of the walking motor is greater than a predefined torque threshold; if the torque of the walking motor is greater than the predefined torque threshold, control the alarm assembly to issue an alarm.

In one example, the control method further includes: in response to the riding lawn mower in the automatic parking mode and not receiving the brake signal, determine whether the first current is greater than a predefined current value; when the first current is greater than the predefined current value, control the alarm assembly to issue an alarm.

DETAILED DESCRIPTION

Figure 1:
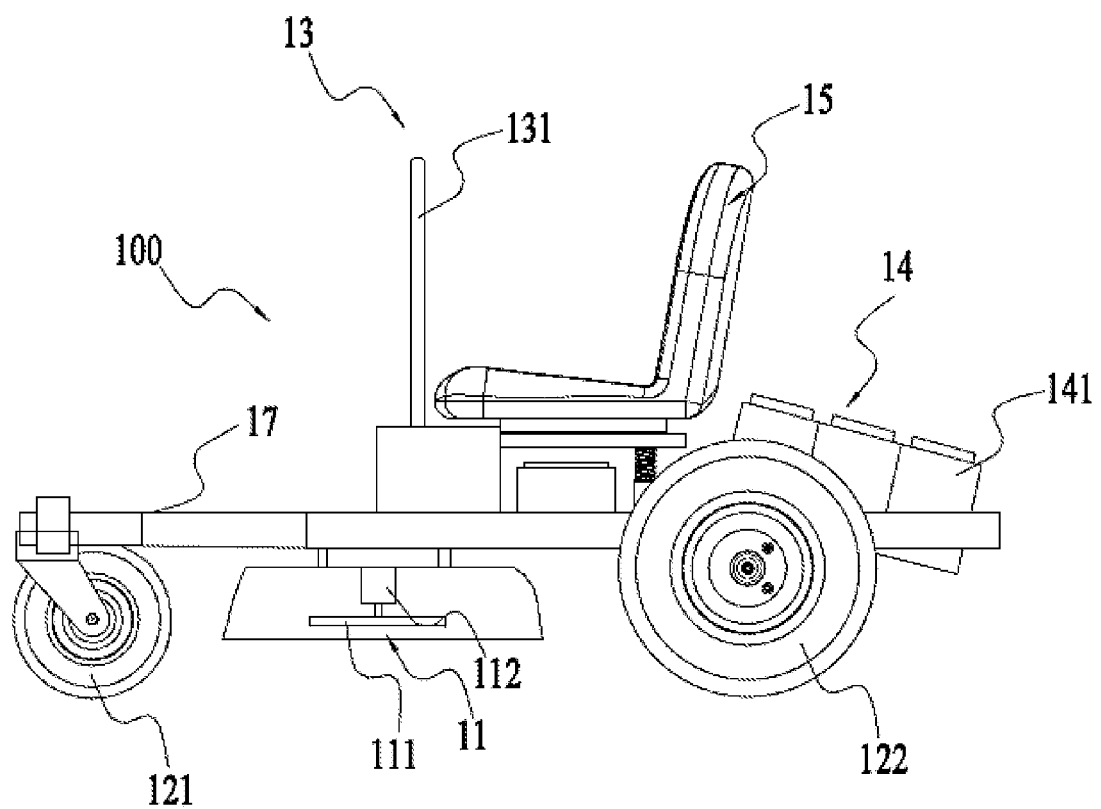
FIG. 1 is an external view of a riding lawn mower from a perspective.

Those skilled in the art should understand that, in the disclosure of this application, the terms "up", "down", "front", "rear", "left", "right" and the like indicate the orientation or positional relationship based on the orientation or positional relationship shown in the drawings, which are only for the convenience of describing the present application, and do not indicate or imply that the device or element referred to must have a specific orientation, or be constructed and operated in a specific orientation, and therefore the above terms should not be understood as a limitation of the present application.

Referring to FIG. 1, a riding lawn mower 100 includes: a power output assembly 11, a walking assembly 12, an operating component 13, a power supply assembly 14, a seat 15, a chassis 16, and a lighting assembly 17.

The chassis 16 is configured to carry the seat 15, and the chassis 16 at least partially extends in a front and rear direction; the seat 15 is for an operator to sit on, and the seat 15 is mounted on the chassis 16.

For the convenience of description, the direction in which the operator sits on the seat is defined as the front or the front side of the riding lawn mower, and the direction opposite to the front is defined as the rear or rear side of the riding lawn mower, and the operator's left hand direction is defined as the left or left side of the riding lawn mower 100, and the operator's right hand direction is defined as the right or right side of the riding lawn mower 100.

The power output assembly 11 includes an output member for outputting power to achieve certain mechanical function. For example, in this example, the output member may be a mowing element 111 for achieving a mowing function, and the power output assembly 11 is also connected to the chassis 16. The power output assembly 11 also includes a cutting motor 112 for driving the mowing element 111 to rotate at a high speed and a cutting control module 113 for controlling the cutting motor 112. The power output assembly 11 may include more than one mowing elements 111, and correspondingly, the number of cutting motors 112 may correspond to the number of mowing elements 111. The cutting motors 112 are controlled by the cutting control module 113. In some specific examples, the cutting control module 113 includes a control chip, such as MCU, ARM, and so on.

In order to obtain a better mowing effect, optionally, the power output assembly 11 may include two mowing elements 111, and correspondingly, two cutting motors 112, namely a left cutting motor 112L and a right cutting motor 112R. Optionally, the two cutting motors 112 are respectively controlled by two cutting control modules 113, and the two cutting control modules 113 are a left cutting control module 113L and a right cutting control module 113R, respectively. That is, the power output assembly 11 includes two cutting control modules 113 and cutting two motors 112. Alternatively, the power output assembly 11 may include only one cutting control module 113, which controls two cutting motors 112 at the same time.

The walking assembly 12 is configured to enable the riding lawn mower 100 to walk on the lawn. The walking assembly 12 may include first walking wheels 121 and second walking wheels 122, the number of the first walking wheels 121 is two, and the number of the second walking wheels 122 is also two, including a left drive wheel 122L and a right drive wheel 122R. The walking assembly 12 may also include walking motors 123 for driving the second walking wheels 122, and the number of walking motors 123 is also two, namely a left walking motor 123L and a right walking motor 123R, respectively. In this way, when the two walking motors 123 drive the corresponding second walking wheels 122 to rotate at different speeds, a speed difference is generated between the two second walking wheels 122, so as to steer the riding lawn mower 100. The walking assembly 12 includes two walking control modules 124, the two walking control modules 124 are a left walking control module 124L and a right walking control module 124R, respectively, which are used to control the left walking motor 123L and the right walking motor 123R, respectively. In some specific examples, the walking control module 124 includes a control chip, such as MCU, ARM, and so on.

The power supply assembly 14 is configured to provide electric power for the riding lawn mower 100. Optionally, the power supply assembly 14 is configured to at least supply power to the cutting motors 112 and the walking motors 123, and the power supply assembly 14 may also supply power to other electronic components in the riding lawn mower 100, such as the cutting control module 113 and the walking control module 124.

In some examples, the power supply assembly 14 is provided on the rear side of the seat 15 on the chassis 16. In some examples, the power supply assembly 14 includes a plurality of battery packs 141 capable of supplying power to the power tool 200. The battery packs 141 are configured to be pluggably mounted to the riding lawn mower 100 by the user. The installation and removal of the battery packs 141 by plugging and unplugging makes the operation more convenient and also the placement of the battery packs 141 more accurate. Optionally, the battery pack 141 includes a plurality of battery cells connected in series, in parallel, or in a combination of series and parallel. A plurality of battery cells are coupled in a battery casing to form a whole, and the battery cell may be a lithium battery cell. The power tool 100 may be a gardening tool such as a string trimmer, a hedge trimmer, a blower, a chain saw, etc., and may also be a torque output tool such as an electric drill, an electric hammer, etc., and may also be a sawing tool such as an electric circular saws, a jig saw, and a reciprocating saw, etc., and may also be a grinding tool such as an angle grinder, a sanding machine, etc. In some other examples, the battery pack 141 may also be configured to power a hand-push power tool, such as a hand-push lawn mower, a hand-push snow blower, and so on. In this way, the battery pack 141 applied to the riding lawn mower of the present application can be unplugged by the user to be applied to the above power tools. In other words, the user can also borrow the battery pack 141 in these power tools to power the riding lawn mower 100, thereby improving the versatility of the riding lawn mower 100 and reducing the usage cost. The power supply assembly 14 includes a battery compartment 144 for placing the battery packs 141. The number of battery compartment 144 may be one, which stores multiple battery packs 141, or may be multiple, for example, the same as the number of battery packs 141, wherein each battery compartment 144 stores one battery pack 141.

The power supply assembly 14 further includes a power supply management module 142 for controlling the operation of the power supply assembly 14. In this example, the power supply management module 142 is configured to control the safe discharge of the plurality of battery packs 141, so that the riding lawn mower 100 can operate normally. In some specific examples, the power supply management module 142 includes a control chip, such as MCU, ARM, and so on.

The riding lawn mower 100 further includes a walking control module 124 for controlling the walking process of the riding lawn mower 100. The walking control module 124 is at least used to control the walking motors 123 of the walking assembly 12 to control the walking process of the riding lawn mower 100. The walking control module 124 can control the walking motors 123 to start.

The operating component 13 is operable by the user, and the user sends control instructions through the operating component 13 to control the operation of the riding lawn mower 100. The operating component 13 can be operated by the user to set the target speed, travel direction, etc. of the riding lawn mower 100. In other words, the operating component 13 can be operated by the user to set the target operating state of the riding lawn mower 100. The operating component 13 includes an operating mechanism 131 and an operation sensing module 132 enabled to sense changes in the state of the operating mechanism.

In some specific examples, the operating mechanism 131 includes at least one operating lever, and the operation sensing module 132 includes at least one position sensor. The operating lever may be arranged on either sides or a periphery of the seat 15. Different positions of the operating lever correspond to different target states of the riding lawn mower. By pushing the operating lever to the target positions, the user controls the riding lawn mower 100 to reach the target states corresponding to the target positions reached by the operating lever, including the traveling direction, traveling speed, parking, braking, deceleration, etc. In a specific example, the operating levers include a left operating lever 131L and a right operating lever 131R, and the walking motors 123 include the left walking motor 123L and the right walking motor 123R. The left operating lever and the right operating lever are used to respectively control the left walking motor 123L and the right walking motor 123R, so as to respectively control the two second walking wheels 122. The position sensor is configured to detect the position of the operating lever. When the operating lever is in different positions, the position sensor outputs detected signals representing different positions.

The operating mechanism 131 may further include at least one switch triggerable to change its state so as to set the riding lawn mower 100 in different target states. The operation sensing module 132 includes a switch state detection assembly, and the switch state detection assembly is configured to detect the state of at least one switch. For example, a seat switch arranged under the seat 15 can sense the user sitting on the seat or leaving the seat; a start switch can start the riding lawn mower 100 when the user presses this switch; a key switch start or stop the walking motor 123 when the user inserts the key and rotates to the on position or the off position. The switch state detection assembly can detect the different states of each switch and send the detected information to the required module.

The operating mechanism of the operating component 13 may also include a combination of one or more operating mechanisms such as a pedal, a switch, a handle, and a steering wheel, for example, the manual operating lever, combined with a foot brake pedal, a speed pedal and a steering wheel is configured for the user to operate the riding lawn mower 100. The operating component 13 may also be a control panel, which includes a plurality of buttons, and different buttons correspond to different control commands. The user inputs different control commands through the switch to control the walking motor 123 of the walking assembly 12. Refer to the communication system of the riding lawn mower 100 according to an example shown in FIG. 3a, the riding lawn mower 100 further includes a bus module 18, and the bus module 18 is connected with a variety of modules, for example, the bus module 18 is at least connected with the cutting control module 113, the walking control module 124, the operation sensing module 132, the power supply management module 142 in order to transmit data between the cutting control module 113, the walking control module 124, the operation sensing module 132, and the power supply management module 142. The cutting control module 113, the walking control module 124, the operation sensing module 132, and the power supply management module 142 can all send data to the bus module 18 and receive data through the bus module 18. When sending data, these modules cannot send data at the same time. At most one device can send data at any time. Each device may obtain the bus control right to send data by competing for the busy line B/F, and the module that obtains the bus control right realize occupation and release of the bus through a "busy bus" signal and an "idle bus" signal. When receiving data, all modules can receive information from the bus module 18, and determine of the information is related to themselves, if yes, then perform corresponding processing, if not, continue the original work. Optionally, the riding lawn mower 100 further includes a lighting assembly for illuminating functions; a lighting control module 172 for controlling the operation of the illuminating light 171, and the lighting control module 172 is connected to the bus module 18. The lighting control module 172 controls the illuminating light 171 to turn on upon receiving a signal that requires lighting.

In an example, the user expects the riding lawn mower 100 to go straight forward at a maximum speed. In a specific implementation, the user operates the operating mechanism 131 to a certain state and issues a command to go straight forward at the maximum speed; the operation sensing module 132 detects command to go straight forward at the maximum speed, which corresponds to the current state of the operating lever of the operating mechanism 131, and sends detected information including the position of the operating lever to the bus module 18; the bus module 18 broadcasts the information to all modules connected to the bus module 18; the walking control module 124, the cutting control module 113, the operation sensing module 132 and the power supply management module 142 receive the information including the position of the operating lever through the bus, and determine the data is related to themselves. At this time, the cutting control module 113 controls the cutting motor to stop working; and according to the acquired signal of the operation sensing module 132, the two walking control modules 124 obtain the rotational speed and the rotational direction of the two walking motors 123 corresponding to the signal through calculation or lookup table. Both walking motors 123 run at the maximum forward rotational speed, so that the riding lawn mower 100 moves straight forward in accordance with the target state set by the operating mechanism.

Similarly, the user controls the riding lawn mower 100 by operating the operating mechanism 131, including controlling the mowing speed, traveling direction and speed of the riding lawn mower 100.

Figure 3A:
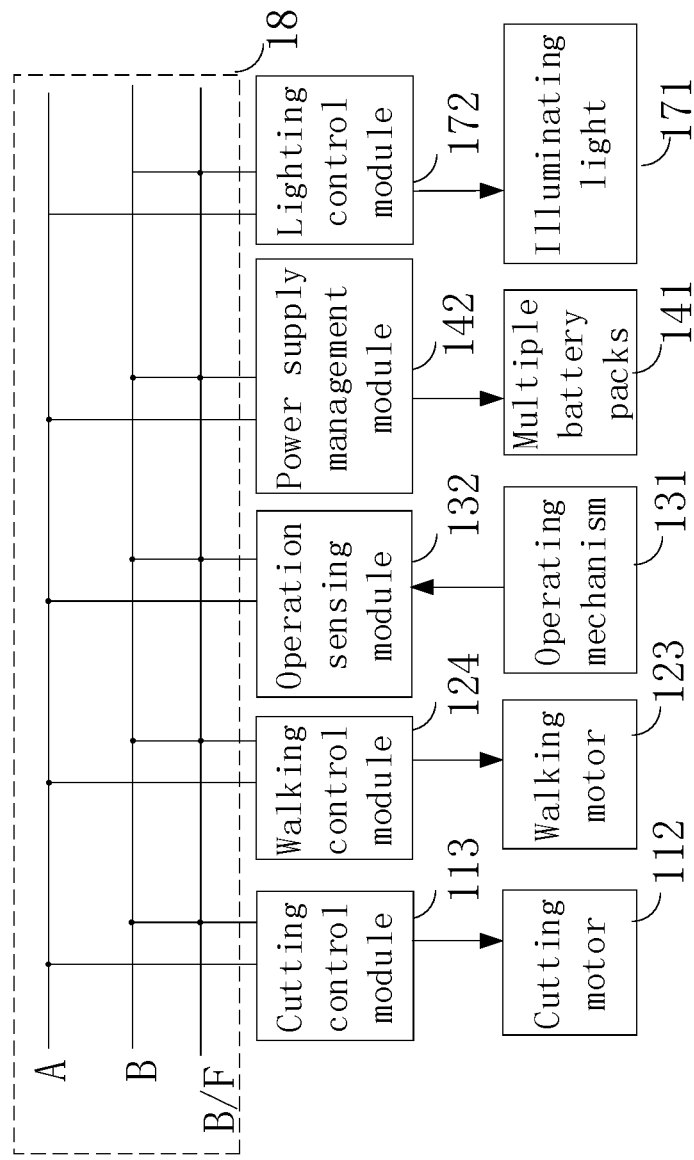
FIG. 3A is a communication system of the riding lawn mower according to an example.
Figure 3B:
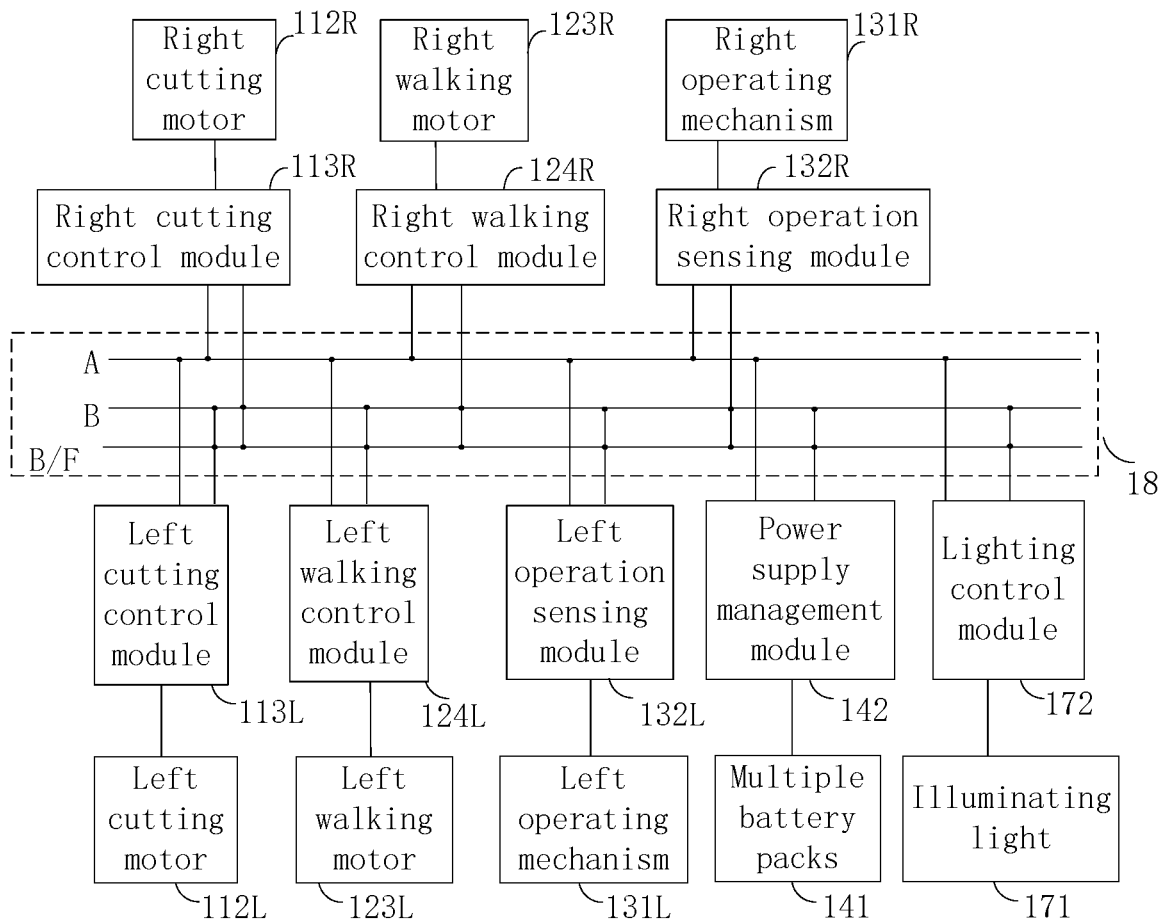
FIG. 3B is a communication system of the riding lawn mower according to another example.

Referring to a communication system of the riding lawn mower 100 according to another example as shown in FIG. 3b, which is different from the communication system of the riding lawn mower shown in FIG. 3a in that: there are two cutting control modules 113, namely a left cutting control module 113L and a right cutting control module 112R, which are respectively configured to control a left cutting motor 112L and a right cutting motor 112R; there are two walking control modules 124, namely a left walking control module 124L and a right walking control module 124R, which are respectively configured to control a left walking motor 123L and a right walking motor 123R; there are two operating mechanisms 131 and two operation sensing modules 132: a left operating mechanism 131L configured to control a left walking motor 123L, and a right operating mechanism 131R configured to control a right walking motor 123R, a left operation sensing module 132L configured to sense the state of the left operating mechanism 131L, and a right operation sensing module 132R configured to sense the state of the right operating mechanism 131R.

In an example, when braking is needed, if the left walking motor 123L has a braking abnormality, the left walking control module 124L sends a signal to the bus module 18, and other modules can receive information on the braking abnormality of the left walking motor 123L from the bus module 18. After receiving the braking abnormality signal, the right walking control module 124R still controls the right walking motor 123R to brake normally. Optionally, when any one of the walking motors has a braking abnormality, the parking mode is automatically triggered, and the riding lawn mower 100 enters the parking mode. This can ensure that the riding lawn mower 100 is parked and stopped when there is a braking abnormality, thereby reducing the occurrence of safety accidents.

Figure 4:
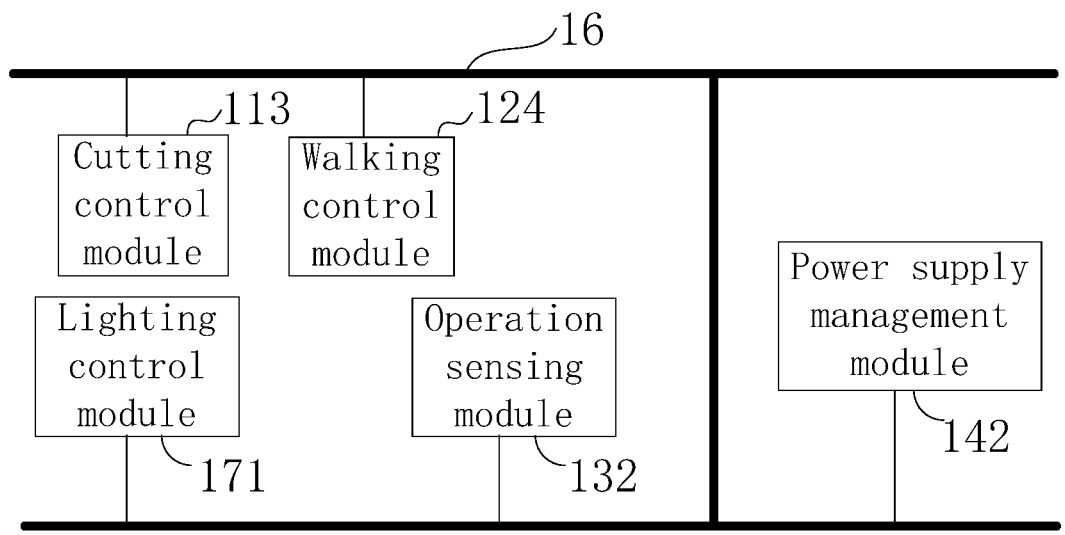
FIG. 4 is a schematic diagram of a connection of negative terminals of various modules of the riding lawn mower according to an example.

Referring to FIG. 4, in an example, the chassis 16 is made of a metallic material, the negative terminals of at least the cutting control module 113, the walking control module 124, and the power supply management module 142 are connected with the chassis 16. The negative terminals of other modules may also be connected to the chassis, including the lighting control module 172 and the operation sensing module 132. In this way, the chassis 16 could be used as the negative terminal of the electric control system of the riding lawn mower 100, which reduces the wiring and cost, and facilitates assembly.

Figure 5:
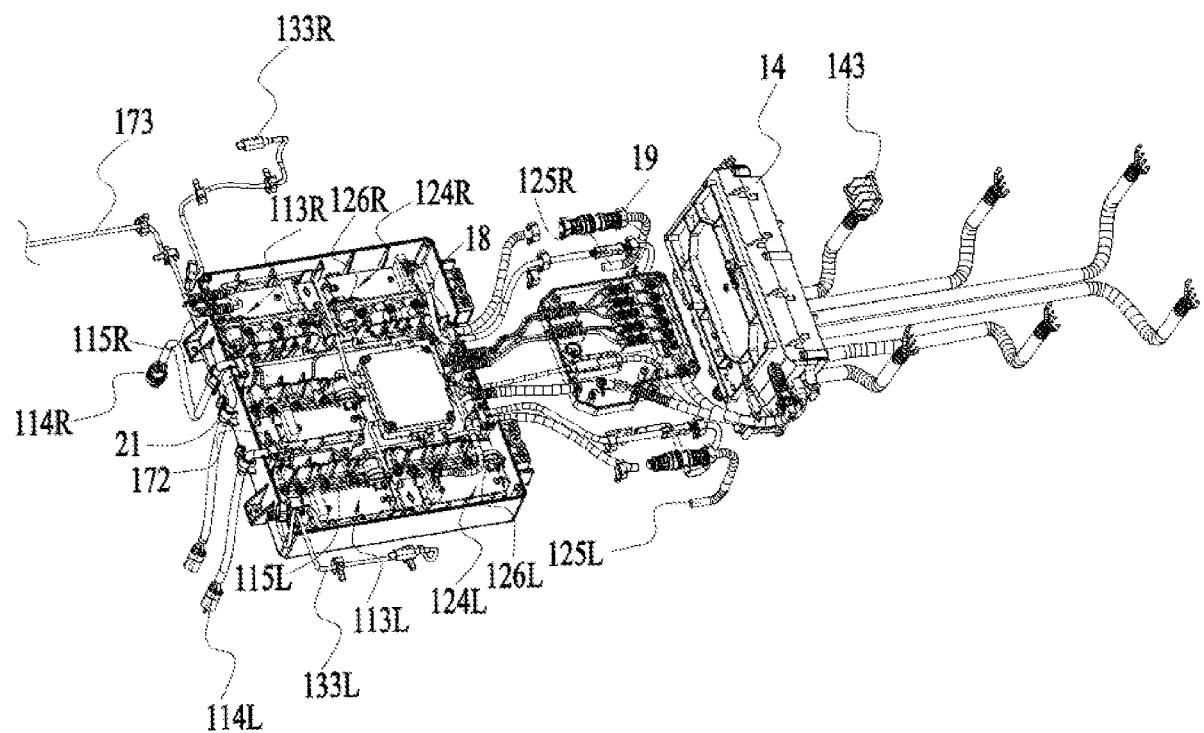
FIG. 5 is a structural diagram of an electric control system of an example of the riding lawn mower from a perspective.

Referring to FIG. 5, according to an example of the riding lawn mower 100, the electric control system includes the left cutting control module 113L, the right cutting control module 113R, the left walking control module 124L, the right walking motor control module 124R, the bus module 18, the power supply management module 142, the left operation sensing module, the right operation sensing module, and a power supply positive junction box 25. Optionally, the lighting control module 172 is also included.

The left cutting control module 113L is configured to control the left cutting motor 112L. The right cutting control module 113R is configured to control the right cutting motor 112R. The left walking control module 124L is configured to control the left walking motor 123L. The right walking control module 124R is configured to control the right walking motor 123R.

The power supply management module 142 is configured to coordinate and control the discharge process of at least one battery pack 141. The electric energy discharged by the at least one battery pack 141 is distributed to other modules through the power supply positive junction box 25, for example, the left cutting control module 113L, the right cutting control module 113R, the left walking control module 124L, the right walking motor control module 124R, the bus module 18 and so on.

The bus module 18 is in commutation connection with the left cutting control module 113L, the right cutting control module 113R, the left walking control module 124L, the right walking control module 124R, the power supply management module 142, the left operation sensing module, and the right operation sensing module, the power supply positive junction box 25 and the lighting control module 172.

The riding lawn mower 100 includes at least one circuit board 19 for installing the cutting control module 113, the walking control module 124, and the power supply management module 142, and optionally, the operation sensing module, the bus module 18 and the illuminating light 171. The circuit board 19 is provided with electronic components, and the electronic components include a controller, a hardware circuit that cooperates with the controller, and the like.

Optionally, the riding lawn mower 100 includes a plurality of circuit boards 19 for respectively installing the cutting control module 113, the walking control module 124, the operation sensing module 132, the power supply management module 142, and the bus module 18. Each of the circuit boards is arranged separately. The advantage is that the above-mentioned modules are separately arranged on different circuit boards, which is convenient for installation and disassembly, facilitates independent maintenance, and reduces maintenance costs.

As an optional solution, the left cutting control module 113L, right cutting control module 113R, left walking control module 124L, right walking control module 124R, bus module 18, power supply management module 24, left operation sensing module 132L, right operation sensing module Both the 132R and the lighting control module 27 include a circuit board, and each module is separately arranged on a plurality of different circuit boards, that is, each module is separately arranged on a circuit board. In this way, each module is self-contained, easy to install and maintain separately, and reduce maintenance costs.

Optionally, the left cutting control module 113L, the right cutting control module 113R, the left walking control module 124L, the right walking control module 124R, the bus module 18, the power supply management module 142, the left operation sensing module 132L, the right operation sensing module 132R, and the lighting control module 172 are all provided with an interface group. The interface group is provided with multiple interfaces.

Figure 6:
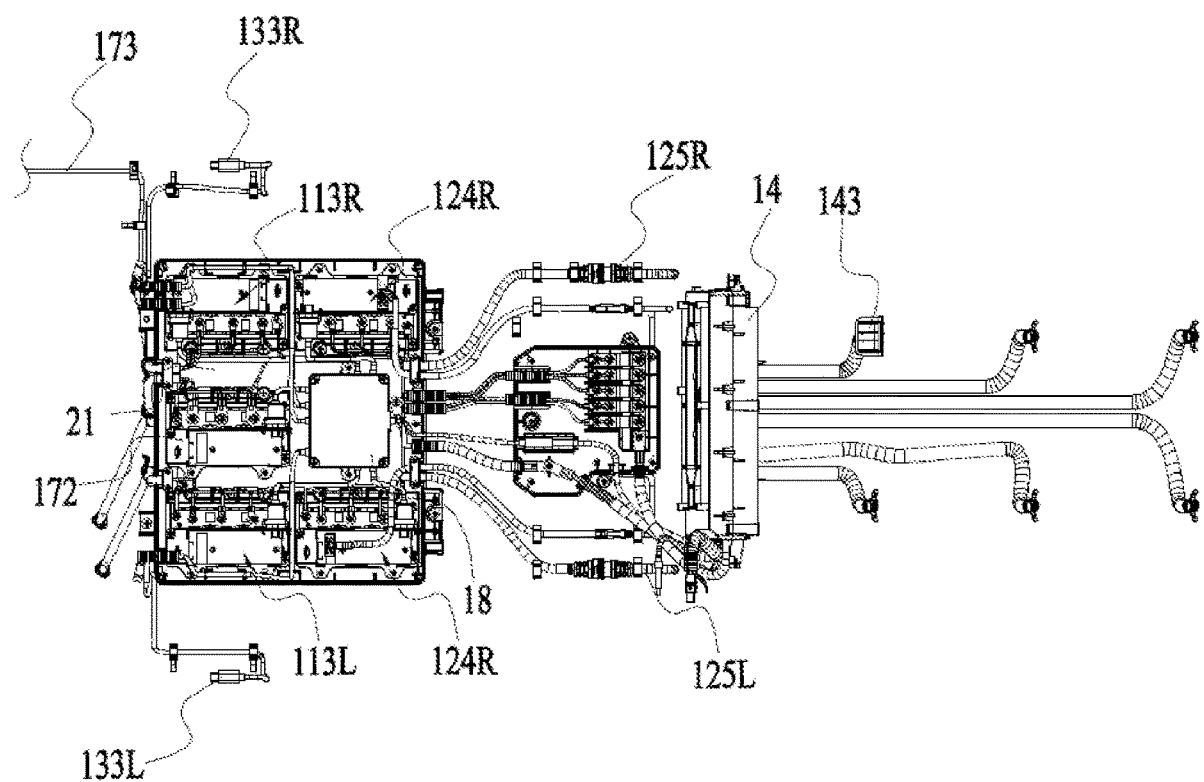
FIG. 6 is a structural diagram of the electric control system of the example of the riding lawn mower from another perspective.
Figure 7:
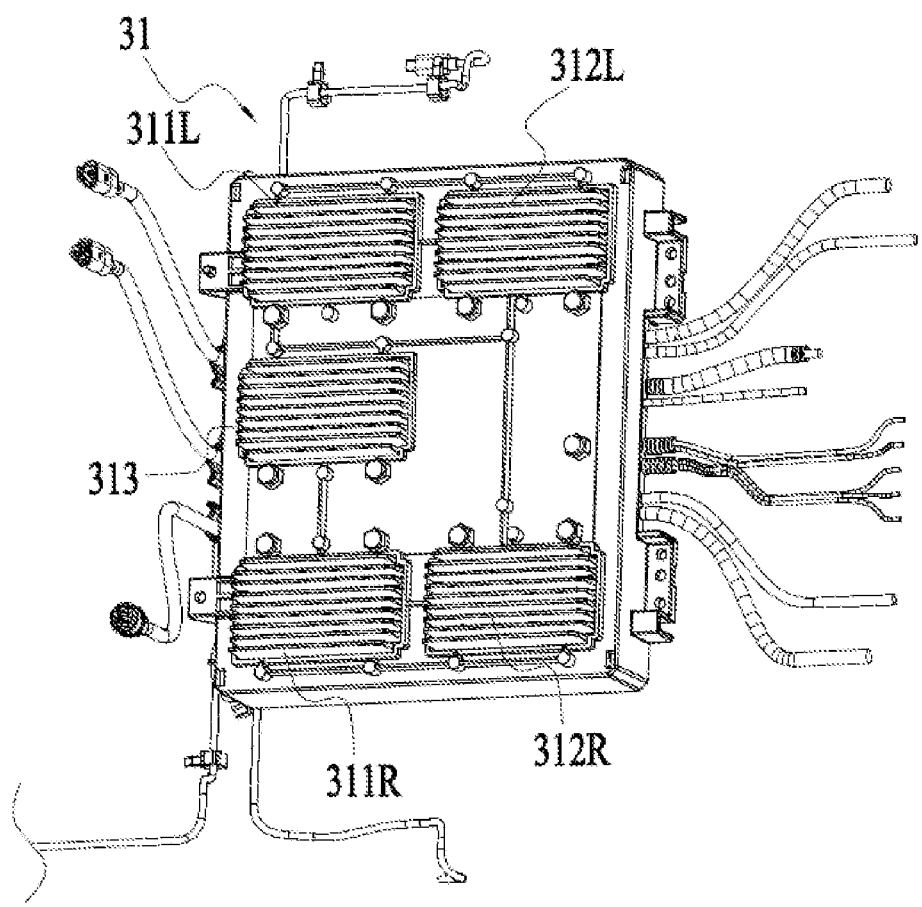
FIG. 7 is a first heat sink of the riding lawn mower.
Figure 8:
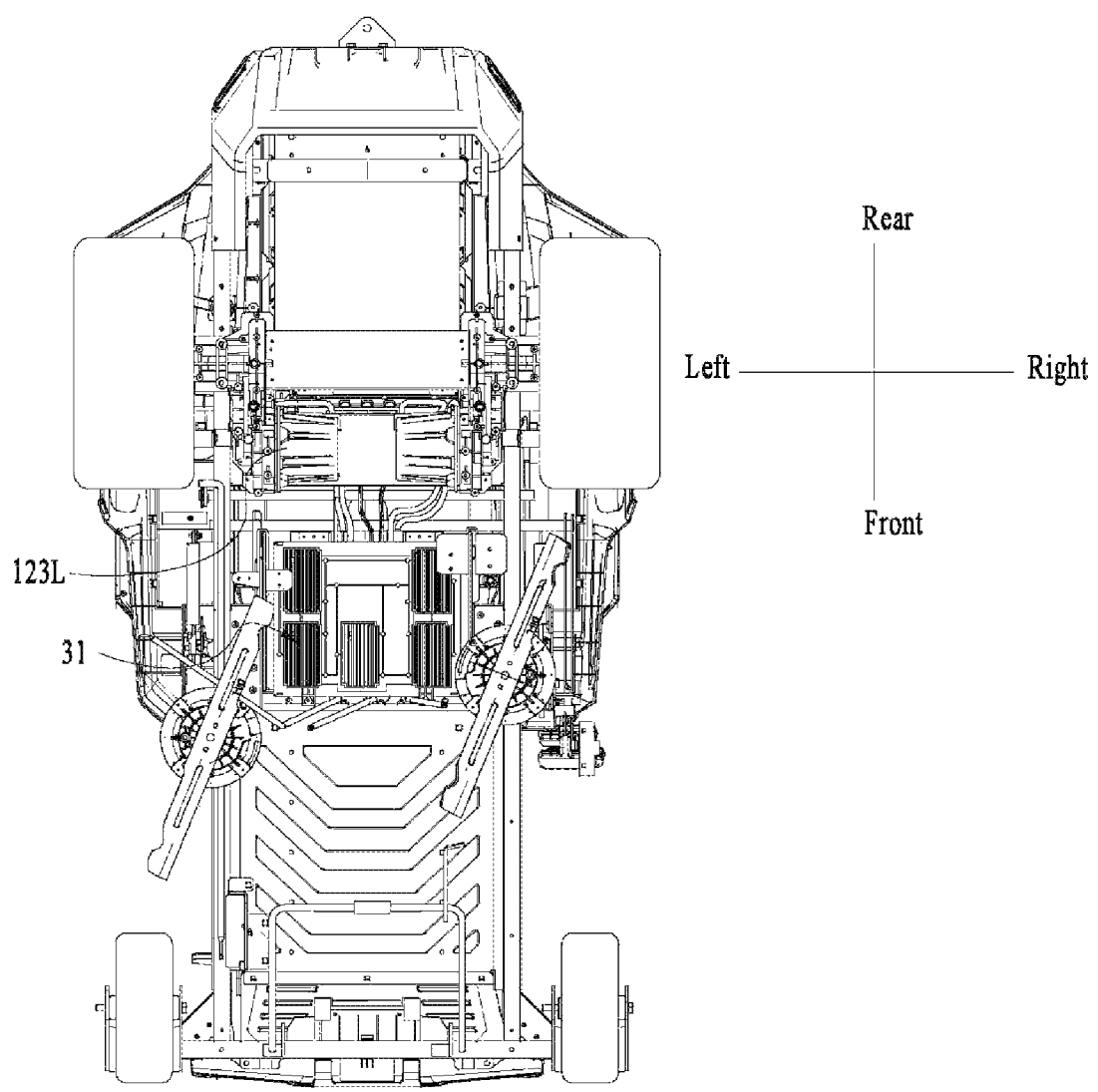
FIG. 8 is a structural diagram of the riding lawn mower from another perspective.

Referring to FIGS. 5 and 6, a left cutting control module 113L is provided with a left cutting motor interface 114L and a communication interface 115L, which are respectively used for connecting the left cutting motor 112L and the bus modules 18. Similarly, the right cutting control module 113R is provided with a right cutting motor interface 114R and a communication interface 115R, which are respectively used for connecting the right cutting motor 112R and the bus module 18.

The left walking control module 124L is provided with a left walking motor interface 125L and a communication interface 126L, which are respectively used for connecting the left cutting motor 123L and the bus module 18. The right cutting control module 124R is provided with a right cutting motor interface 125R and a communication interface 126R, which are respectively used for connecting the right cutting motor 123R and the bus module 18. The lighting control module 172 is provided with an interface 173 for connecting the illuminating light 171.

The power supply management module 142 is provided with a plurality of battery pack interfaces 143 for connecting with the plurality of battery packs 141. The power supply management module 142 is also provided with a bus positive output terminal, which is connected to the power supply positive junction box 25, and a plurality of positive output terminals are branched out through the power supply positive junction box 25. The plurality of positive output terminals are used to connect with the power ports of other modules to provide electric power to other modules. The power supply management module 142 is also provided with a communication interface for connecting the bus module 18 through a communication wire.

The bus module 18 is also provided with multiple interfaces, including a communication interface for connecting each module and a positive power terminal. For example, the bus module 18 is provided with a communication interface 133L for connecting the left operation sensing module 132L and a communication interface 133R for connecting the right operation sensing module 132R. The bus module 18 has a plurality of communication interfaces for connecting with the above-mentioned modules through communication wires. Optionally, the communication interface is a type-C interface to facilitate insertion and assembly.

In this way, each module can be connected to other external modules or components through an interface, so that the modules can be connected to each other through a wire and without complicated circuit design and layout, making the structure of the electric control system of the riding lawn mower 100 more compact, reliable, and simple, and making the modules easy to replace, repair and assemble.

When the interface group is provided with multiple interfaces, each interface can be connected to wires of different colors or lengths, which can effectively prevent the wires from being connected incorrectly and damaging the electrical components.

Optionally, the plurality of circuit boards and the plurality of modules are arranged under the seat 15. This has the advantage of saving space, lowering the center of gravity of the whole machine, and making the operation of the riding lawn mower safer and more stable. In this example, the left cutting control module 113L, the right cutting control module 113R, the left walking control module 124L, the right walking control module 124R, the bus module 18, and the lighting control module 172 are arranged under the seat 15, and the left operation sensing module 132L is arranged near the left operating mechanism 131L, and the right operation sensing module 132R is arranged near the right operating lever 131R.

Optionally, the power supply management module 142 may be arranged on the lower rear side of the seat 15, at a position close to the front of the battery compartment 144, to save space.

Figure 9A:
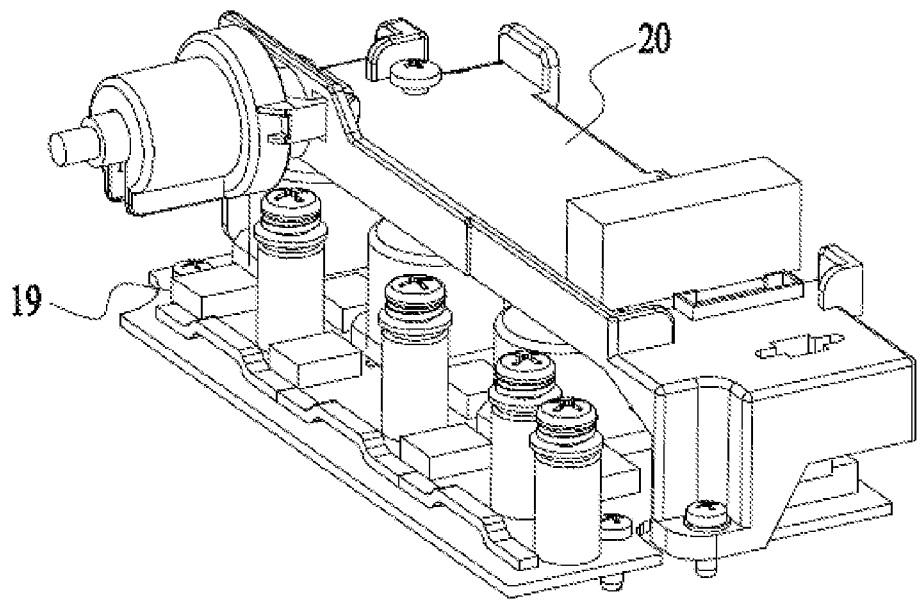
FIG. 9A is a structural diagram of a circuit board including a cover from a perspective.
Figure 9B:
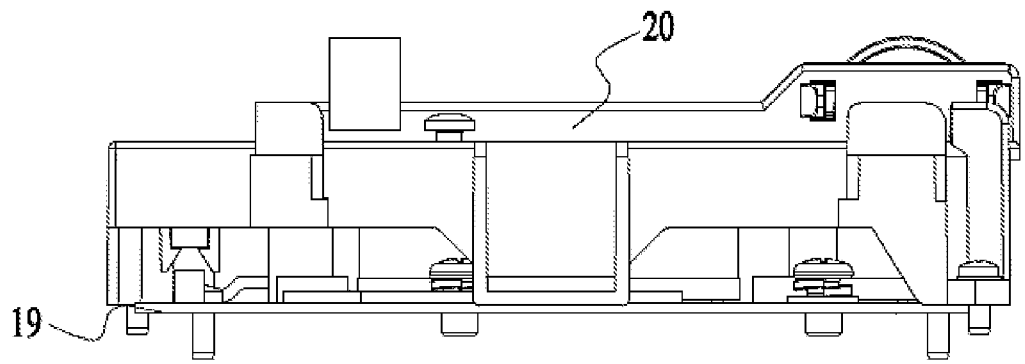
FIG. 9B is a structural diagram of the circuit board including the cover from another perspective.
Figure 10:
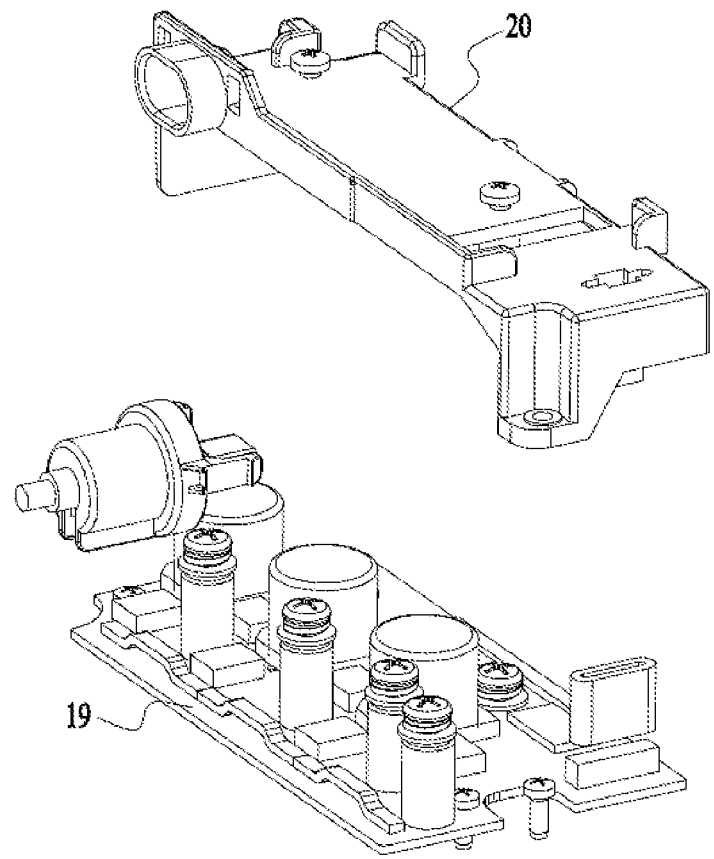
FIG. 10 is a structural diagram of the circuit board and the cover separated from each other from a perspective.
Figure 11:
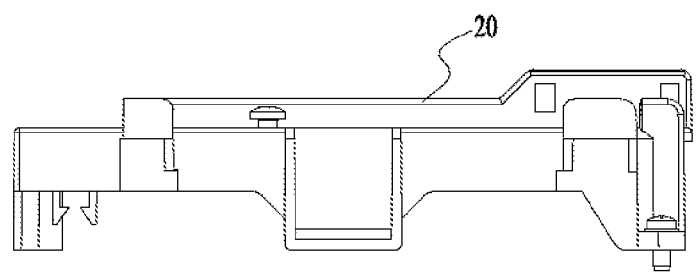
FIG. 11 is a structural diagram of the circuit board and the cover separated from each other from another perspective.
Figure 11:
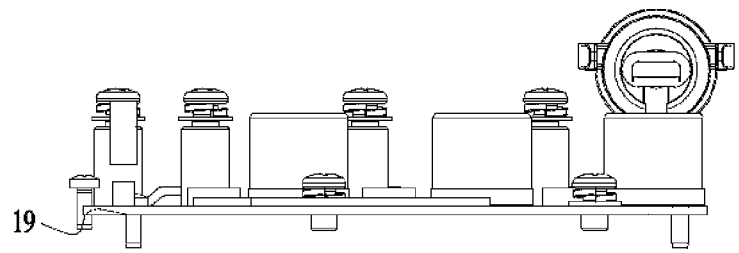

Referring to FIGS. 9-11, optionally, a detachable cover 20 is provided on the circuit board 19, the cover 20 is at least partially located above the core components on the circuit board, for example, above the controller to protect the components on the circuit board. Optionally, the cover 20 is provided in a semi-open form. In other words, the cover is not completely closed, so that external airflow can flow through the electronic components on the circuit board, which improves the cooling effect of the control module and the components.

Optionally, the riding lawn mower 100 further includes a metal plate 21, which is disposed on the lower side of at least one of the cutting control module 113, the walking control module 124, and the power supply management module 142. The negative terminal of at least one of the cutting control module 113, the walking control module 124, and the power management module 142 is connected to the metal plate.

In an optional example, the cutting control module 113 includes a left cutting control module 113L and a right cutting control module 113R, and the walking control module 124 includes a left walking control module 124L and a right walking control module 124R. The left cutting control module 113L and the left walking control module 124L share a metal plate, the right cutting control module 113R and the right walking control module 124R share a metal plate, and the bus module 18 and the lighting control module 172 share a metal plate. The power supply management module 142 uses a metal plate alone. The above-mentioned left cutting control module 113L, right cutting control module 113R, left walking control module 124L, right walking control module 124R, bus module 18, and lighting control module 172 can all share a metal plate, that is, the negative terminals of the above modules are all connected to the same metal plate.

Optionally, the metal plate is made of aluminum material. The advantage is that the negative terminal of each module can be connected through the metal plate 21, thereby reducing the wiring, simplifying the wiring difficulty, reducing the cost, and facilitating maintenance.

Referring to FIGS. 5-8, the riding lawn mower 100 includes a heat sink for cooling the electrical control system. Optionally, the riding lawn mower 100 includes a first heat sink 31, which is located close to the cutting control module 113 and/or the walking control module 124 and faces the ground, which is mainly used to cool the controller in the control module and the electronic components that generate heat.

The first heat sink 31 includes a plurality of cooling fins, and the plurality of cooling fins are vertically arranged at the bottom of the circuit board of the cutting control module 113 and/or the walking control module 124 to increase the cooling area. The cooling fins are arranged in parallel with the front and rear direction of the riding lawn mower. When the riding lawn mower 100 is walking, the airflow flows through the cooling fins, creating a good cooling effect.

In an alternative example, the cutting control module 113 includes a left cutting control module 113L and a right cutting control module 113R, the walking control module 124 includes a left walking control module 124L and a right walking control module 124R, and the first heat sink 31 includes a left cutting heat sink 311L, a right cutting heat sink 311R, a left walking heat sink 312L and a right walking heat sink 312R, wherein the left cutting heat sink 311L is disposed on the lower side of the left cutting control module 113L, and the right cutting heat sink 311R is disposed on the lower side of the right cutting control module 113R, the left walking heat sink 312L is disposed on the lower side of the left walking control module 124L, and the right cutting heat sink 311R is disposed on the lower side of the right walking control module 124R.

Optionally, the first heat sink 31 further includes a lighting control heat sink 313, which is disposed on the lower side of the lighting control module 172 for cooling the lighting control module 172.

The first heat sink 31 is disposed facing the ground. In the example with the metal plate 21, the first heat sink 31 is disposed on the lower side of the metal plate 21. When the riding lawn mower 100 is walking, the airflow flows through the first heat sink 31 to take away the heat of the first heat sink 31 and the above-mentioned control module, creating a good cooling effect. The number of first heat sinks 31 of the riding lawn mower 100 can be configured according to actual cooling requirements.

Optionally, the riding lawn mower 100 includes a second heat sink 32, and the second heat sink 32 is disposed close to the power supply management module 142 and facing the front of the riding lawn mower 100.

The second heat sink 32 includes a plurality of cooling fins, and the plurality of cooling fins are vertically arranged at the bottom of the circuit board of the power supply management module 142 facing the front of the riding lawn mower 100 to increase the cooling area. The cooling fins are arranged substantially in parallel with the up and down direction of the riding lawn mower. When the riding lawn mower 100 is walking, the airflow flows through the cooling fins, creating a good cooling effect.

The second heat sink 32 is used for cooling the power supply management module 142, and is mainly used for the controller in the power supply management module and the electronic components that are prone to generate heat. When the riding lawn mower 100 travels forward, the airflow from the front of the riding lawn mower 100 flows through the second heat sink 32, taking away the heat from the power supply management module 142 and the second heat sink 32, creating a good cooling effect.

Figure 12:
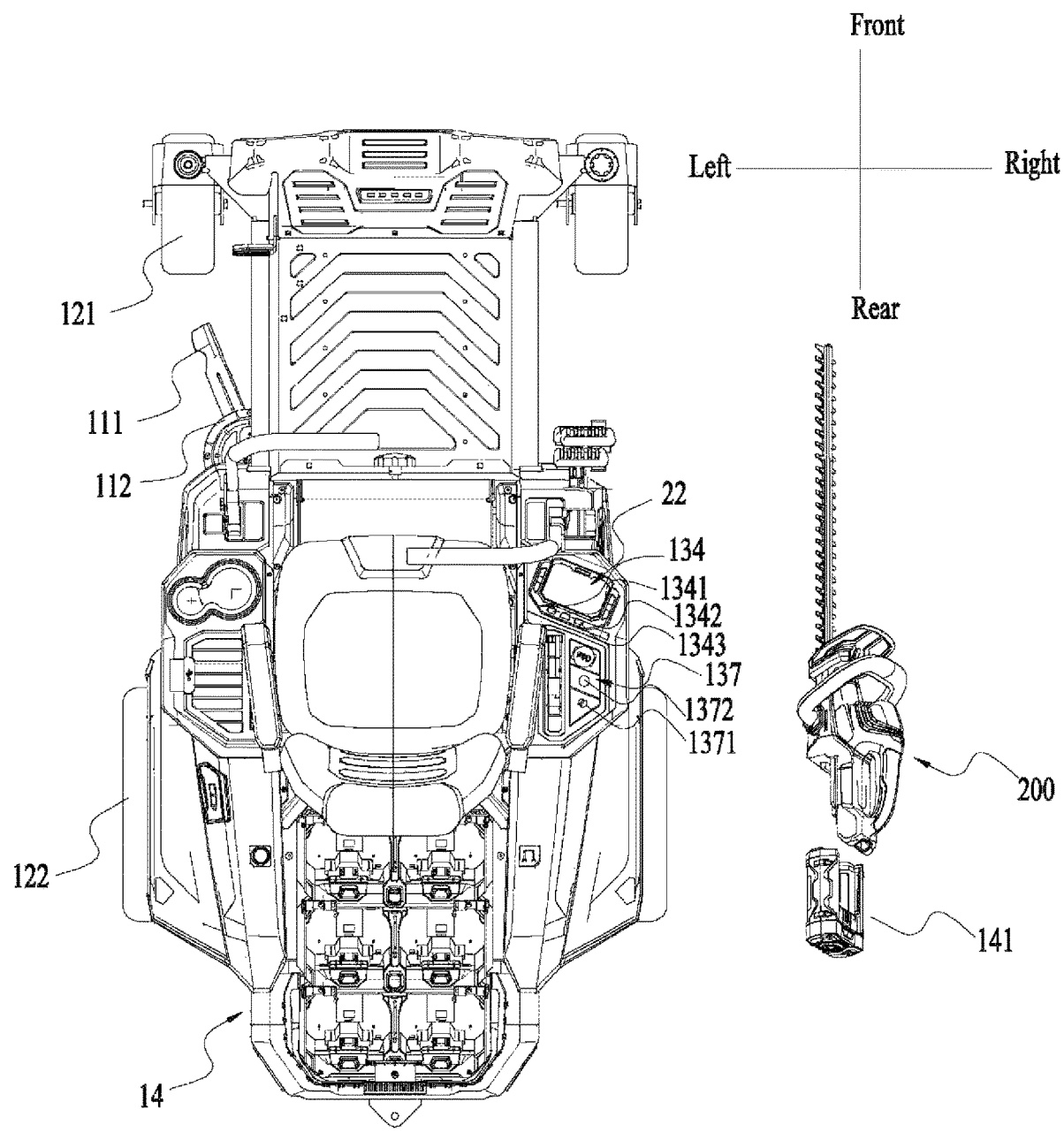
FIG. 12 is a structural diagram of the riding lawn mower from another perspective.

Referring to FIG. 12, in an example, the operating component 13 is operable by the user to allow the operator to control the riding lawn mower 100. The operating component 13 includes a first operating component 134; the first operating component 134 sets the starting mode of the walking motor 123; the first operating component 134 has a first operating state and a second operating state. The first operating state is configured to start the walking motor 123 in the first starting mode. In the first starting mode, the walking motor 123 starts at a first starting acceleration. The second operating state is configured to start the walking motor 123 in the second starting mode. In the second starting mode, the walking motor 123 starts at a second starting acceleration. The first starting acceleration is less than the second starting acceleration.

As an alternative, the first operating component 134 is provided on the operation panel 22 (FIG. 13), and the first operating component 134 includes different starting mode buttons, such as a first starting mode button 1341 and a second starting mode button 1342. When the first starting mode button 1341 is pressed, the first operating component 134 is in the first operating state. When the second starting mode button 1432 is pressed, the first operating component 134 is in the second operating state. The first operating component 134 may also be separately provided outside the operation panel 22. The operation panel 22 may be a touch display screen.

In some examples, the first operating component 134 also has a third operating state, and the third operating state is configured to trigger the walking motor 123 to start in a third starting mode. For example, the first operating component 134 may be the aforementioned operation panel 22, and the first operating component 134 further includes a third starting mode button 1343. When the third starting mode button 1343 is pressed, the first operating component 134 is in the third operating state. At this time, the walking motor 123 starts in the third starting mode. In the third starting mode, the walking motor 123 starts at a third starting acceleration, and the third starting acceleration is greater than the second starting acceleration.

Optionally, when the first operating component 134 is in the third operating state, the walking control module 124 controls the walking motor 123 to start in the third starting mode, the walking motor 123 starts at the third starting acceleration, and the third starting acceleration is greater than the second starting acceleration.

By configuring multiple starting accelerations, different starting modes can be provided. When the user needs to start quickly, the user can choose the third starting mode with a large starting acceleration to start at the third starting acceleration. When the user needs to start slowly, the user can choose the first starting mode with a small staring acceleration to start at the first starting acceleration. Different user experiences can be accommodated.

As an optional solution, when the power supplied by the power supply assembly 14 is a first power, the walking motor 123 starts at the first starting acceleration in the first starting mode, and the walking motor 123 starts at the second starting acceleration in the second starting mode. When the power supplied by the power supply assembly 14 is a second power, the walking motor 123 starts at the third starting acceleration in the first starting mode, and the walking motor 123 starts at the fourth starting acceleration in the second starting mode.

In some specific examples, the power supply assembly 14 includes a plurality of battery packs 141, the more the number of dischargeable battery packs 141 inserted into the riding lawn mower 100 or the sum of the number of cell groups connected in parallel in all battery packs 141, the more power the power supply assembly 14 can provide to the walking motor 123. In order to make full use of the power when the power supplied by the power supply assembly 14 is high, to meet the needs of users for quick start, and when the power supplied by the power supply assembly 14 is low, to extend the working time of the riding lawn mower 100 as much as possible, the starting acceleration in each starting mode when the power supplied by the power supply assembly 14 is high (for example, the first power) is higher than the starting acceleration in each starting mode when the power supplied by the power supply assembly 14 is low (for example, the second power). The riding lawn mower includes a power detection module for detecting the power supplied by the power supply assembly 14. The power detection module is connected to the power supply assembly 14 and the walking control module 20. If the user selects the first starting mode, the current first starting acceleration in the first starting mode is less than the first starting acceleration in the first starting mode when the power detected by the power detection module is higher than the current power. By analogy, the starting acceleration under the same starting mode can be different due to the power supplied by the power supply assembly 14. The lower the power supply, the less the starting acceleration value under the same starting mode; the higher the power supply, the greater the starting acceleration value under the same starting mode.

In some examples, the riding lawn mower 100 further includes a second operating component 135. The second operating component is configured to send a start signal to start the walking motor 123. The second operating component 135 sends a start signal, and the walking motor 123 starts according to the starting mode corresponding to the operating state of the first operating component 134. The second operating component 135 may include an operating lever, and the operating lever includes a left operating lever 131L and a right operating lever 131R.

For example, when the left operating lever 131L and the right operating lever 131R are simultaneously pushed out of the neutral position and enter any one of the forward position or the reverse position, the state at this time indicates that the start signal is issued.

The first operating component 134 is also used to set the braking mode of the walking motor 123; the first operating component also has: a fourth operating state configured to brake the walking motor 123 in the first braking mode, and in the first braking mode, the walking motor brakes at a first braking acceleration; a fifth operating state configured to brake the walking motor in the second braking mode, and in the second braking mode, the walking motor brakes at a second braking acceleration; wherein the second braking acceleration is different from the first braking acceleration.

By configuring different braking accelerations, different braking modes can be provided. For example, if the second braking acceleration is greater than the first braking acceleration, when the user needs to brake quickly, the second braking acceleration with a greater braking acceleration can be selected, and when the user needs to brake comfortably, the first braking acceleration with a less braking acceleration can be selected.

Similarly, the braking acceleration under the same braking mode can also be different according to the power supplied by the power supply assembly 14. The lower the power supply, the less the braking acceleration value under the same braking mode, the higher the power supply, the greater the braking acceleration value under the same braking mode.

The second operating component 135 is further configured to send a brake signal to brake the walking motor; the walking control module 20 is configured to: after the second operating component 135 sends a start signal, start the walking motor 123 according to the starting mode corresponding to the operating state of the first operating component 134; after the second operating component 135 sends a brake signal, brake the walking motor according to the braking mode corresponding to the operating state of the first operating component 134.

The walking control module 124 controls the start and brake of the walking motor 123, optionally, the walking control module 124 may also control the normal operation of the walking motor 123, that is, the walking control module 124 may control the whole operation process of the walking motor 123.

Optionally, the riding lawn mower 100 further includes a brake pedal 136 for the user to mechanically brake the riding lawn mower 100, and the user depresses the brake pedal 136 to make the riding lawn mower 100 slow down and stop.

As an optional solution, the riding lawn mower 100 further includes a third operating component 137 for making the riding lawn mower 100 enter a ready state. That is, after the operator sits on the seat 15, the third operating component 137 needs to be operated first before starting the walking motor 123 subsequently.

The third operating component 137 includes: a first trigger 1371 for powering on the walking control module 124; a second trigger 1372 for enabling the walking motor 123 to start, for example, start according to the starting mode set by the first operating component 134. The walking control module 20 is configured to control the walking motor 123 to start after the first trigger 1371 is triggered and then the second trigger 1372 is triggered. That is, only after the first trigger is triggered and then the second trigger is triggered, the walking motor 123 can be controlled to start, for example, the control module starts the walking motor 123 according to the starting mode set by the first operating component 134 and the target speed set by the second operating component 135. Otherwise, if only the third operating component 137 is triggered or the sequence of triggering the first triggering component 1371 and the second triggering component 1372 is different, even if the first operating component 134 is provided with a starting mode and the second operating component 135 sends a start signal, the walking motor 123 will not start. Optionally, the first trigger 1331 can also be used to power on the cutting control module and the display module. By providing at least two triggers and their triggering sequence, it is possible to prevent the operator from erroneously triggering the walking motor 123, thereby improving the operational safety of the riding lawn mower 100.

The walking control module 124 can obtain a trigger state of the first trigger 1371. In some specific examples, the first trigger 1371 includes a safety key and a key socket. When the safety key is inserted into the key socket, the first trigger 1371 is triggered. Optionally, a sensing module is provided in the key socket, which can detect whether the safety key is inserted into the key socket, and transmit information to the walking control module 124, thus, the walking control module 124 can obtain the information detected by the sensing module on whether they safety key is inserted into the key socket.

Optionally, during the walking process of the riding lawn mower 100, if it is detected that the first trigger is not triggered, for example, the safety key is pulled out of the key socket, then control the walking motor 123 to power off or to brake and then power off, and the riding lawn mower 100 enters a low power consumption state. In the low power consumption state, the cutting motor 112 and the walking motor 123 are powered off and stopped, only some display modules can still display, and the controllers in the cutting control module and the walking control module 20 enter the low power consumption state. This avoids accidents caused by abnormal control of the walking motor 123 when the operator pulls out the key by mistake or the key jumps out of the key socket during the walking process of the riding lawn mower 100, thereby improving the driving safety of the riding lawn mower 100.

The walking control module 124 can obtain a trigger state of the second trigger 1372. In some examples, the second trigger 1372 includes a start button, and the user may press the start button to trigger the second member 1372. The second trigger 1372 may be, for example, a signal switch connected to the walking control module 124. The walking control module 124 can obtain the switch state of the signal switch. When the signal switch is triggered to change the switch state, the walking control module 124 detects that the second trigger 1372 is triggered.

Optionally, during the walking process of the riding lawn mower 100, if the second trigger 1372 is triggered, then control the walking motor 123 to remain in current state or to power off or to brake and then power off, and the riding lawn mower 100 enters a low power consumption state. This avoids accidents caused by abnormal control of the walking motor 123 when the operator accidentally triggers the second trigger 1372 during the walking process of the riding lawn mower 100, thereby improving the driving safety of the riding lawn mower 100.

Figure 13:
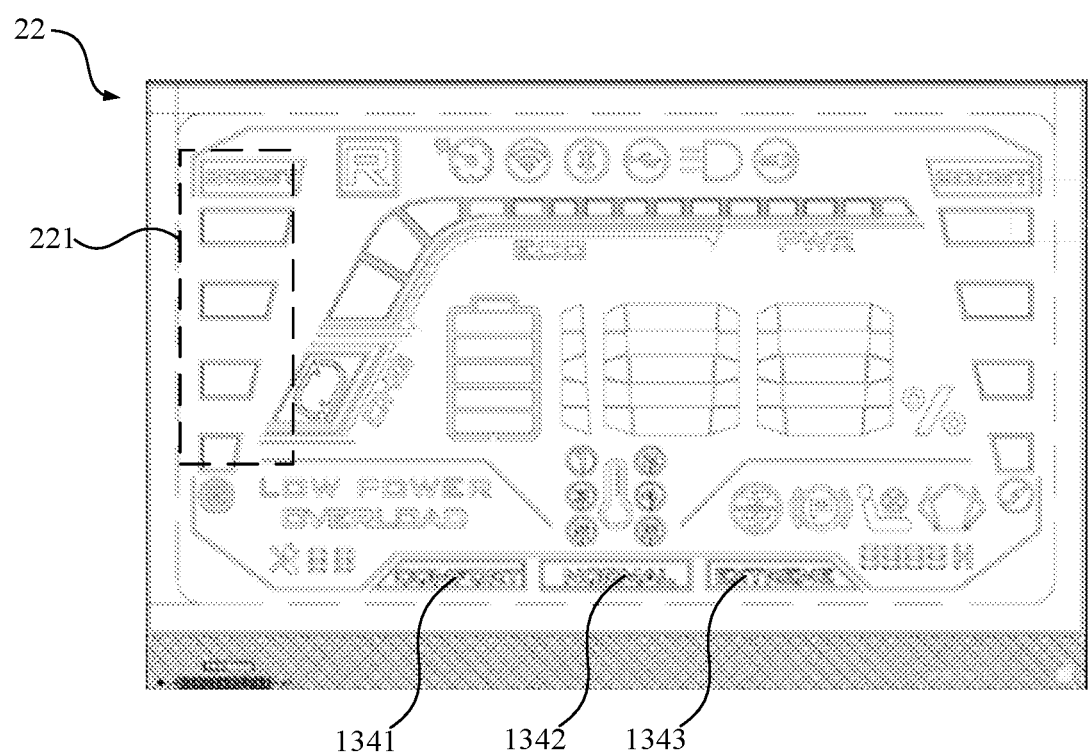
FIG. 13 is an operation panel of the riding lawn mower.

As an optional solution, the operating component further includes a fourth operating component for setting the speed gear of the walking motor 123; the walking control module 124 is configured to: when the walking motor 123 rotates, disable the speed gear setting function of the fourth operating component. Referring to FIG. 13, in some examples, the fourth operating component is a plurality of gear setting operation buttons 221 on the operation panel, for setting the speed gear of the walking motor 123. Under different speed gears, the maximum rotational speed of the walking motor 123 is different. Optionally, the higher the speed gear position is, the higher the maximum rotational speed of the walking motor 123. When the walking motor 123 rotates, even if the fourth operating component is operated to change the speed gear position, the speed gear position still retains in the original gear position, and the speed gear setting function of the walking motor 123 is disabled. This avoids the conflict of the current rotational speed of the walking motor 123 and the gear speed set by the operator due to wrong operations during the walking process of the riding lawn mower 100, which affects driving safety.

Optionally, the walking control module 20 is configured to control the walking motor 123 to stop rotating when the fourth operating component is operated. That is, when the speed gear of the walking motor 123 is set through the fourth operating component, prohibit the operation of the walking motor 123 and thus the walking of the riding lawn mower 100, thereby avoiding the abnormal operation of the walking motor 123.

Referring to FIG. 5, optionally, the riding lawn mower 100 further includes an operation panel 22, and a plurality of buttons are provided on the operation panel 22, at least a first button and a second button are provided. The first button is configured to control a first function; when the first button is pressed, the first function is triggered. The second button is configured to control a second function; when the second button is pressed, the second function is triggered. When both the first button and the second button are pressed, a third function is triggered. The third function is different from the first function and the second function. Optionally, the operation panel 22 is a touch display screen with a touch function.

In an example, the first operating component 134 is provided on the operation panel 22, and the first operating component includes a first starting mode button 1341, a second starting mode button 1342, and a third starting mode button 1343. For example, a first button is the first starting mode button 1341, and a second button is the second starting mode button 1342. When these two buttons are operated separately, they have different functions. The first starting mode button 1341 is configured to set the first starting acceleration. The second starting mode button 1342 is configured to set the second starting acceleration. When both the first starting mode button 1341 and the second starting mode button 1342 are pressed, the third function can be triggered. In some examples, the third function is configured to adjust the maximum output rotational speed of the walking motor 123. In some specific examples, the third function is configured to enable the first braking mode or the second braking mode. In some specific examples, the third function can be used to call up a Bluetooth interface. In some specific examples, the third function can call up a wireless connection interface and start a cruise control function. In some specific examples, call up the USB setting function. The first button, the second button, and the third function generated by the combination of the first button and the second button can all be set by the user according to requirements.

Optionally, the riding lawn mower 100 further includes a charging interface for connecting an external power source to charge the battery pack inserted into the power supply assembly 14. The charging interface includes: a charging sensing module with a first state and a second state for sensing whether an external power source is connected; in the first state, the external power source is connected to the charging interface; in the second state, the external power source is not connected to the charging interface. The walking control module 124 is configured to: when the charging sensing module is in the first state, the walking control module 124 controls the walking motor 123 to slow down.

Optionally, the riding lawn mower 100 is provided with a charging interface, into which an external power source can plug, such as a 220V alternating current. When the external power source is plugged into the charging interface, the charging sensing module can sense the plug-in of the external power source. In a specific example, the charging sensing module has a signal switch, which is provided in the charging interface. When the plug of an external power source is plugged into the charging interface, the signal switch is touched by the plug of the power source to change the state, so that the plug-in of the external power source can be sensed. In some specific examples, the sensing module includes a detection circuit, which may include a voltage divider resistance. When the external power supply is plugged in, the voltage of the output terminal of the voltage divider resistance changes, so that the plug-in of the external power supply can be detected.

The walking control module 124 can obtain the status of the sensing module. When the sensing module detects that the external power supply is plugged in, the walking control module 124 controls the walking motor 123 to slow down. Optionally, the walking control module 124 controls the walking motor 123 to brake and decelerate to stop. In other words, when the external power supply is plugged into the charging interface, the walking motor 123 needs to decelerate and stop to prevent damages to the charging interface or the external power socket or other components of the riding lawn mower 100 caused by the riding lawn mower 100 walking while charging.

Optionally, the riding lawn mower 100 further includes a cutting control module for controlling the operation of the cutting motor; the cutting control module is configured to control the cutting motor 112 to reduce the speed when the charging sensing module is in the first state. Optionally, control the cutting motor 112 to brake and decelerate to stop. In other words, when the external power supply is plugged into the charging interface, the cutting motor 112 needs to decelerate and stop to prevent accidents caused by the riding lawn mower 100 mowing while charging.

Figure 14:
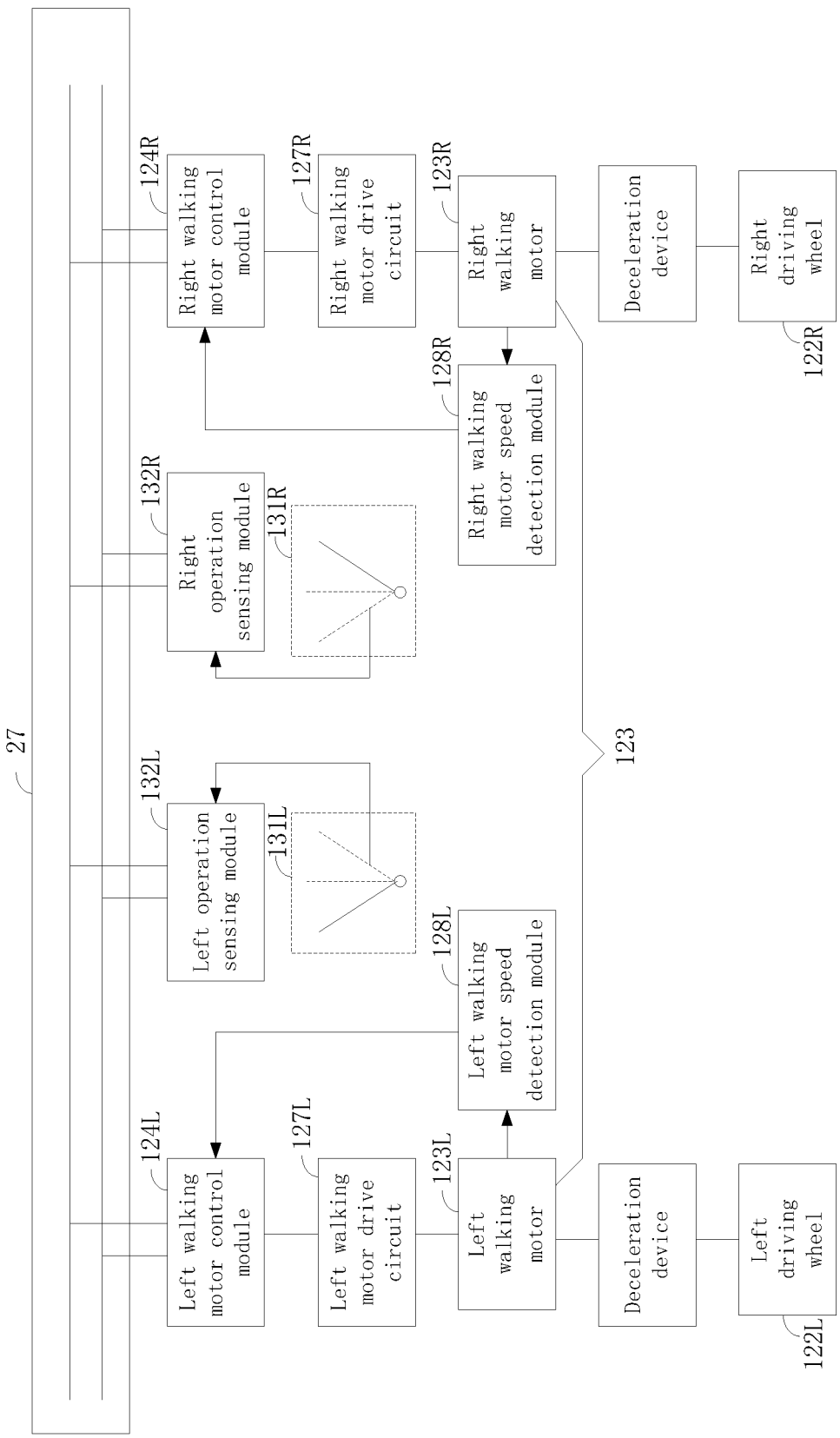
FIG. 14 is a control system of a walking motor of the riding lawn mower.

Referring to FIG. 14, in an example, a control system of the walking motors 123 includes a left walking motor control system and a right walking motor control system. The left walking motor control system and right walking motor control system have the same or similar functions and components. Take the left walking motor control system as an example, which mainly includes: a left walking motor control module 124L, a left walking motor drive circuit 127L, a left operation sensing module 132L, a left walking motor speed detection module 128L, and a left walking motor 123L.

The left walking motor control module 124L is configured to control the operation of the left walking motor 123L; it is connected with the left operation sensing module 132L, the left walking motor speed detection module 128L, and the left walking motor drive circuit 127L, and is configured to adjust a control amount of the left walking motor 123L according to the detection signals of the left operation sensing module 132L and the left walking motor speed detection module 128L, and output a control signal to the left walking motor drive circuit 127L, thereby controlling the left walking motor drive circuit 127L to make the left walking motor drive circuit 127L drive the left walking motor 123L to reach or substantially reach the target rotational speed set by the left operating mechanism 131L as soon as possible. The control amount of the left walking motor 123L includes the input voltage and/or the input current of the left walking motor 123L.

The left operation sensing module 132L is coupled with the left operating mechanism 131L and configured to detect the operating state of the left operating mechanism 131L, and output which to the left walking motor control module 124L, so that the left walking motor control module 124L can obtain the target rotational speed and direction of the left walking motor 123L according to the detected result of the left operation sensing module 132L. In this example, the operating mechanism 131 may be the first operating component 134 as described above, which includes a left operating lever 131L and a right operating lever 131R, and the left operation sensing module 132L is coupled with the left operating lever 131L for detecting the position of the left operating lever 131L. The left operation sensing module 132L includes an angle sensor or a position sensor for detecting a rotated angle or a rotated position of the left operating lever 131L.

The left walking motor speed detection module 128L is coupled with the left walking motor 123L and configured to detect the actual rotational speed of the left walking motor 123L. As an alternative, the left walking motor speed detection module 128L includes a speed detection sensor, which is arranged near or inside the left walking motor 123L to obtain the actual rotational speed of the left walking motor 123L; for example, a photoelectric sensor installed near the left walking motor 123L to obtain the actual rotational speed of the left walking motor 123L; for another example, a Hall sensor arranged near the rotor inside the left walking motor 123L to obtain the actual rotational speed of the left walking motor 123L according to the rotational speed of the rotor.

However, in some cases, for example, when the walking motor 123 operates at high speed and/or high temperature, or the first walking wheel 121 runs at high speed and/or high temperature, or the riding lawn mower operates at high temperature, the detection accuracy of the sensor will be affected, the speed detection sensor can even be invalid. Therefore, in order to solve this problem, in another implementation, the left walking motor speed detection module 128L does not include a sensor, and the left walking motor speed detection module 128L uses a brushless walking motor 123. The electrical signal output by the left walking motor speed detection module 128L is a periodically changed back electromotive force, thus, by detecting the current and/or voltage of the left walking motor 123L, the periodic change of the left walking motor speed detection module 128L can be obtained from the zero-crossing point of the back electromotive force, thereby, the actual rotational speed of the left walking motor speed detection module 128L can be obtained. In this way, there is no need for a sensor to detect the actual rotational speed of the left walking motor speed detection module 128L, which reduces cost, meanwhile, the detection accuracy is not affected by high speed or temperature, and the whole machine structure is more compact.

The left walking motor drive circuit 127L is connected to the left walking motor control module 124L and the left walking motor 123L, and configured to control the operation of the left walking motor 123L according to the signal output by the left walking motor control module 124L.

Optionally, the left walking motor 123L may be connected to the left drive wheel 122L through a deceleration device. The output speed of the left walking motor 123L is decelerated by the deceleration device 41L and then output to the left drive wheel 122L to drive the left drive wheel 122L to rotate. The torque of the left walking motor 123L is transmitted to the left drive wheel 122L through the deceleration device to drive the left drive wheel 122L. In other examples, the left walking motor 123L and the left drive wheel 122L are directly connected.

The right motor control system mainly includes: a right walking motor control module 124R, a right operation sensing module 132R, a right walking motor speed detection module 128R, a right walking motor drive circuit 127R, and a right walking motor 123R. The right walking motor control system has the same or similar functions and components as the left walking motor control system, so will not be further described herein.

In the foregoing example, the left walking motor control module 124L, the left operation sensing module 132L, the right walking motor control module 124R, and the right operation sensing module 132R are all connected to the bus 27, and information transmission between the various devices is implemented through the bus. Through the bus 27, the target rotational speed and direction of the left walking motor 123L set by the left operating mechanism 131L detected by the left operation sensing module 132L can be transmitted to the left walking motor control module 124L through the bus 27. Similarly, the target rotational speed and direction of the right walking motor 123R set by the right operating mechanism 24R detected by the right operation sensing module 23R can be transmitted to the right walking motor control module 20R through the bus 27.

Figure 15:
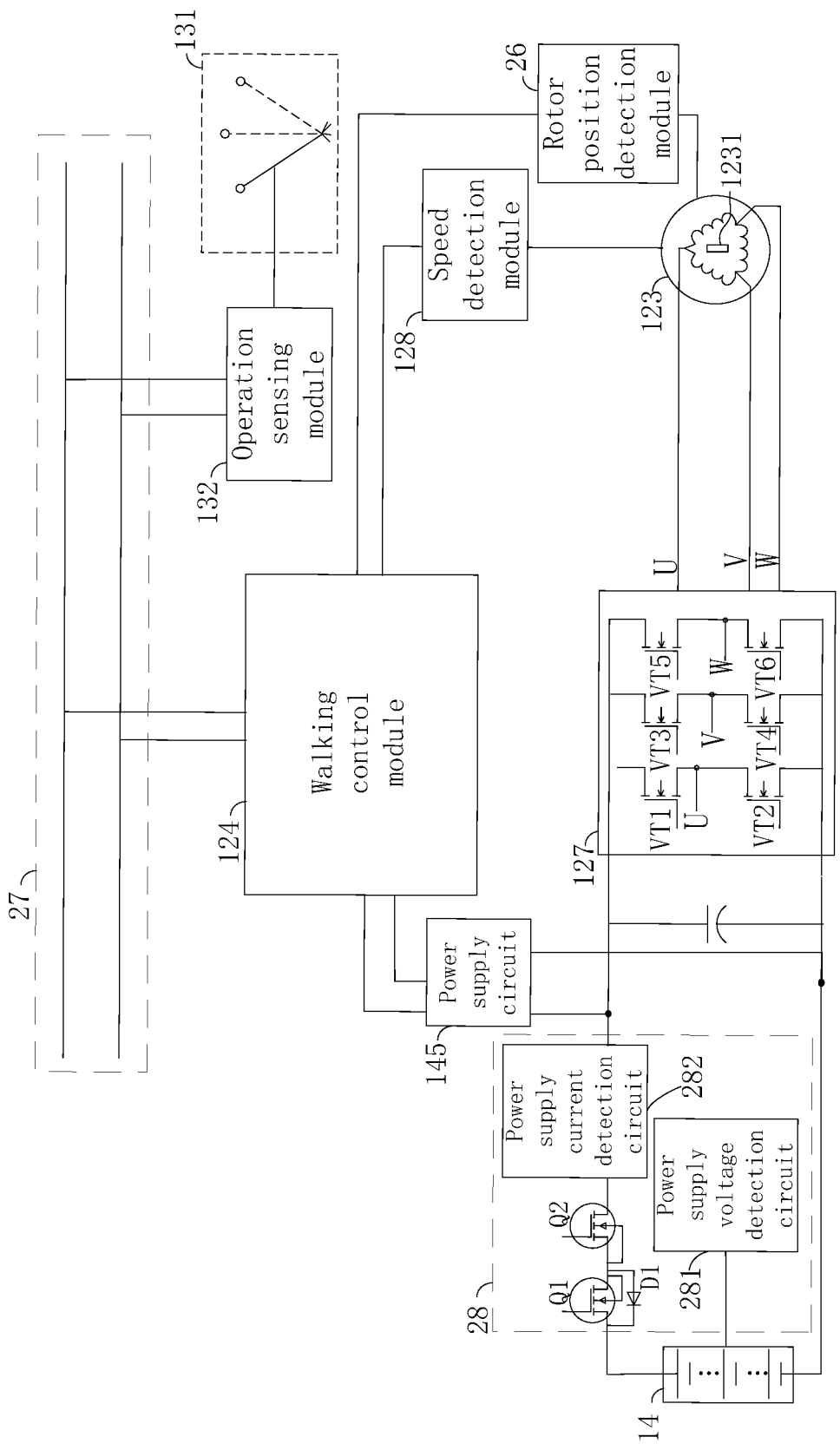
FIG. 15 is a specific control circuit of the walking motor of the riding lawn mower.

Referring to FIG. 15, in an example, a control system for a walking motor includes: a walking control module 124, a drive circuit 127, a power supply circuit 145, and a speed detection module 128. Since the control systems of the left and the right walking motors 123 have the same or similar functions and components, the control system of this example can be applied to the control system of the left and the right walking motors 123.

The walking control module 124 is configured to control the running process of the walking motor 123. In some examples, the walking control module 124 adopts a dedicated controller, such as some dedicated control chips (for example, MCU, Microcontroller Unit). The power supply circuit 145 is connected to the power supply assembly 14, and the power supply circuit 145 is configured to receive the power from the power supply assembly 14 and convert the power of the power supply assembly 14 into the power at least used by the walking control module 124. The power supply assembly 14 includes a plurality of aforementioned battery packs 141.

Optionally, the riding lawn mower 100 further includes a drive circuit 127. The drive circuit 127 is electrically connected to the walking control module 124 and the walking motor 123 and controls the operation of the walking motor 123 according to the control signal output by the walking control module 124. In an example, the walking motor 123 is a three-phase brushless motor with three-phase windings, and the drive circuit 127 is electrically connected to the three-phase windings of the walking motor 123. The drive circuit 127 includes power switches, which turn on and off the electrical connection between the power supply assembly 14 and the walking motor 123, and also adjust the current output from the power supply assembly 14 to the walking motor 123 according to different control signals output by the walking control module 124.

The walking control module 124 is configured to output corresponding drive signals to the drive circuit 127 according to the position of the rotor 1231 of the walking motor 123 to switch the driving state of the drive circuit 127, thereby changing the voltage and/or current applied to the windings of the walking motor 123, so as to generate an alternating magnetic field to drive the rotor to rotate, thereby driving the walking motor 123.

The position of the rotor 1231 of the walking motor 123 can be obtained by the rotor position detection module 26. The rotor position detection module 26 may include sensors, for example, a plurality of Hall sensors, arranged along the circumferential direction of the rotor 1231 of the walking motor 123. When the rotor 1231 rotates into and out of a predefined range, the signals of the Hall sensors change, and the output signal of the rotor position detection module 26 also changes accordingly. In this way, the detected signal output by the rotor position detection module 26 can be used to determine the position of the rotor 1231 of the walking motor 123. Optionally, the position of the rotor 1231 can also be estimated based on the current of the walking motor 123.

Optionally, the riding lawn mower 100 further includes a speed detection module 128, which is coupled with the walking motor 123 and configured to detect the actual rotational speed of the walking motor 123. Optionally, the speed detecting module 128 includes a speed detection sensor, which is disposed near or inside the walking motor 123 to obtain the actual speed of the walking motor 123; for example, a photoelectric sensor installed near the walking motor 123 to obtain the actual rotational speed of the walking motor 123; for another example, a Hall sensor arranged near the rotor inside the walking motor 123 to obtain the actual rotational speed of the walking motor 123 according to the rotational speed of the rotor.

The user controls the rotational speed and direction of the walking motor 123 through the operating mechanism 131. The operating mechanism 131 is configured to set the target speed and the direction of rotation of the walking motor 123, so that the target speed and the direction of the riding lawn mower 100 can be set.

In an example, the operating mechanism 131 may be the aforementioned second operating component 135, which includes an operating lever arranged on either sides or the periphery of the seat 15. The user controls the riding lawn mower 100 to reach the state corresponding to the target position reached by the operating lever by pushing the operating lever to the target position. In a specific example, the operating mechanism 131 includes operating levers, for example, a left operating lever 131L and a right operating lever 131R, for controlling the left walking motor 123L and the right walking motor 123R respectively, so as to respectively control the two second walking wheels 122.

The riding lawn mower 100 further includes an operation sensing module 132 for sensing the operating state of the operating mechanism 131. In this example, the operation sensing module 132 is configured to detect the position of the operation lever and transmit the detected position information of the operation lever to the walking control module 124. The walking control module 124 obtains the target speed, rotation direction, starting or braking, etc. of the corresponding walking motor according to the detected position of the operating lever by calculation or lookup table. When the two walking motors 123 drive the corresponding second walking wheels 122 to rotate at different speeds, a speed difference is generated between the two second walking wheels 122, so that the riding lawn mower 100 realizes steering.

In a specific example, the left operating lever 131L and the right operating lever 131R each have a forward position, a reverse position, and a neutral position. When the operator sits on the seat 15 and pushes the left operating lever 131L or the right operating lever 131R in the front and rear direction to a certain position in the forward position, the left walking control module 124L or the right walking control module 124R obtain the forward rotational speed of the left walking motor 123L or the right walking motor 123R corresponding to the current position of the left operating lever 131L or the right operating lever 131R detected by the operation sensing module 132 by lookup table, thereby controlling the left walking motor 123L or the right walking motor 123R to operate according to the target state set by the corresponding left operating lever 131L or right operating lever 131R, thus the corresponding walking wheels move forward.

Similarly, when the operator sits on the seat 15 and pushes the left operating lever 131L or the right operating lever 131R to a certain position in the reverse position, the left walking control module 124L or the right walking control module 124R obtain the reverse rotational speed of the left walking motor 123L or the right walking motor 123R corresponding to the current position of the left operating lever 131L or the right operating lever 131R detected by the operation sensing module 132 by lookup table, thereby controlling the left walking motor 123L or the right walking motor 123R to operate according to the target state set by the corresponding left operating lever 131L or right operating lever 131R, thus the corresponding walking wheels move forward.

When the operator sits on the seat 15 and simultaneously pushes the left operating lever 131L and the right operating lever 131R outward from the neutral position in the left and right direction, the parking signal is triggered, and the riding lawn mower 100 enters the parking mode. When the operator sits on the seat 15 and pushes the left operating lever 131L or the right operating lever 131R to the neutral position, the walking motor corresponding to that operating lever stops.

When the left operating lever 131L and the right operating lever 131R reach the same position in the forward position, the left walking motor 123L and the right walking motor 123R of the riding lawn mower 100 follow the target speed set by the left operating lever 131L and the right operating lever 131R to rotate forwardly, driving the riding lawn mower 100 to move forward in a straight line. When the left operating lever 131L and the right operating lever 131R reach the same position in the reverse position, the left walking motor 123L and the right walking motor 123R of the riding lawn mower 100 follow the target speed set by the left operating lever 131L and the right operating lever 131R to rotate reversely, driving the riding lawn mower 100 go move backward in a straight line. The operating mechanism can also be a combination of a steering wheel and an accelerator.

When starting, the second operating component 135 is configured to send a start signal to start the walking motor 123. For example, when the left operating lever 131L and the right operating lever 131R are simultaneously pushed away from the front and rear direction to a position of the forward position or the reverse position, the operation sensing module 132 senses that the left operating lever 131L and the right operating lever 131R is away from the neutral position, and outputs the current position information of the left operating lever 131L and the right operating lever 131R to the two walking control modules 124. After receiving this information, it is believed that the operator has sent a start signal through the operating mechanism 131; then the two walking control modules 124 respectively obtain the speed and steering of the two walking motors 123 corresponding to the current position information by lookup table or calculation and start the walking motors 123 according to the starting mode set by the operator through the first operating component 134 before starting.

When braking, the second operating component 135 is configured to send a brake signal to brake the walking motor 123. As a specific example, when the left operating lever 131L and the right operating lever 131R are simultaneously pushed away from the neutral position to the outermost position in the left and right direction, the operation sensing module 132 senses the current position of the left operating lever 131L and the right operating lever 131R, and outputs the current position information of the left operating lever 131L and the right operating lever 131R to the two walking control modules 124. After receiving this information, it is believed that the operator has sent a brake signal through the operating mechanism 131; then the two walking control modules 124 brake the walking motors 123 according to the braking mode set by the operator through the first operating component 134.

Figure 16:
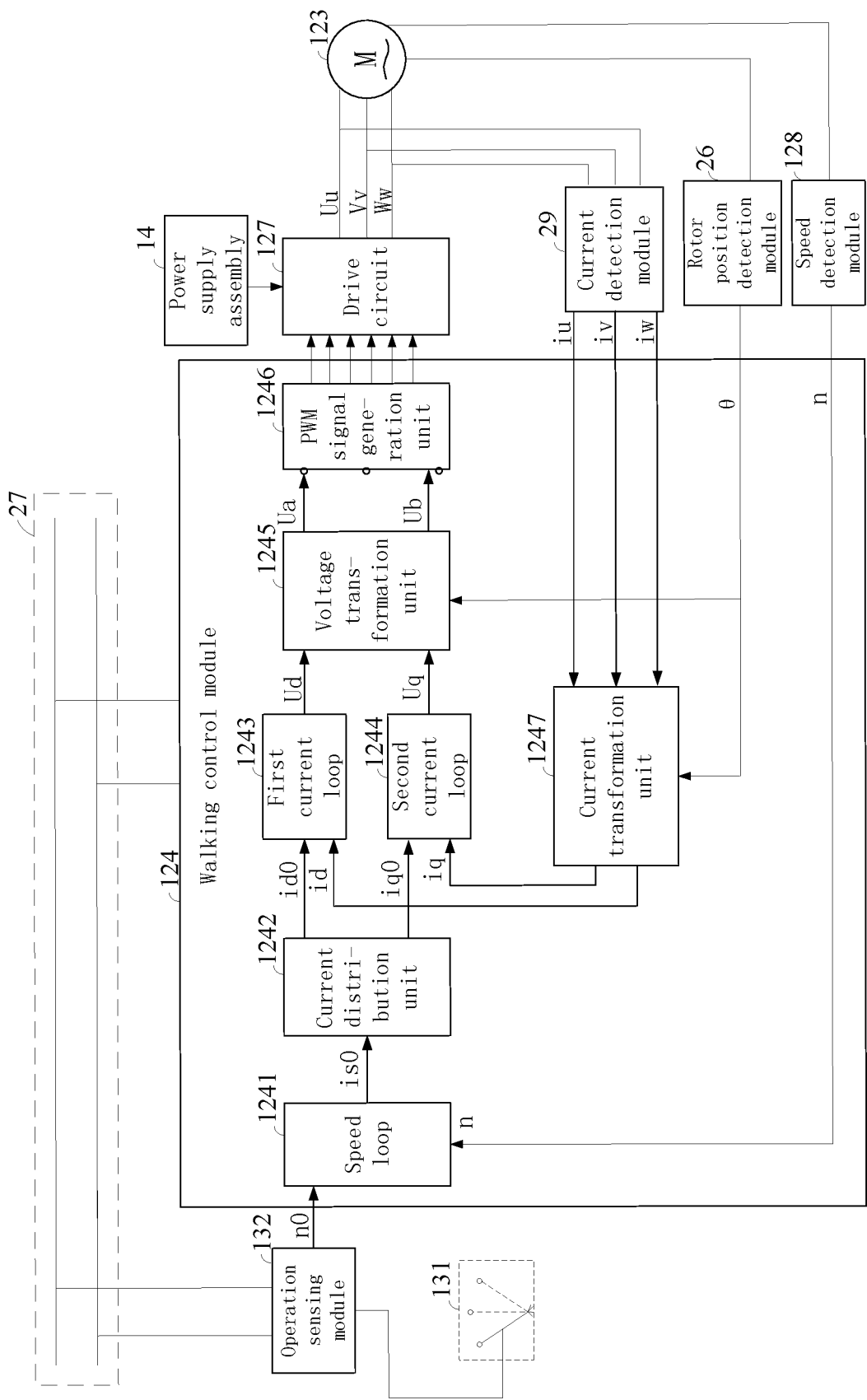
FIG. 16 is a walking control module of the riding lawn mower according to an example.

Referring to FIG. 16, in a specific example, the walking control module 124 includes: a speed loop 1241, a current distribution unit 1242, a first current loop 1243, a second current loop 1244, a voltage transformation unit 1245, a current transformation unit 1247 and a PWM signal generation unit 1246.

The first speed loop 1241 is coupled and connected with a target speed detection module 129 and a speed detection module 128. The first speed loop 201 acquires the target rotational speed n0 of the walking motor 123 set by the user through the operating mechanism 131 detected by the target speed detection module 129 and the actual rotational speed n of the walking motor 123 detected by the speed detection module 128. The operation sensing module 132 is coupled with the operating mechanism. In this example, the operation sensing module 132 is coupled with the operating lever, and configured to detect the position or the angle of rotation of the operating lever. The operation sensing module 132 may include a position sensor, such as a magnetic sensor.

The first speed loop 1241 is configured to generate a target current is0 according to the target rotational speed n0 and the actual rotational speed n of the walking motor 123. Alternatively, the first speed loop 1241 can generate a target current is0 through comparison and adjustment according to the target rotational speed n0 and the actual rotational speed n of the walking motor 123. The target current is0 is used to make the actual rotational speed n of the walking motor 123 approach the target rotational speed n0. The first speed loop includes a comparison and adjustment unit and the adjustment unit may be a PI adjustment unit.

The current distribution unit 1242 is connected to the first speed loop 1241 and is used to distribute a direct axis target current id0 and a quadrature axis target current iq0 according to the target current is0.

Referring to FIG. 16, the direct axis and the quadrature axis form a direct axis—quadrature axis coordinate system. The direct axis—quadrature axis coordinate system establishes a coordinate system on the rotor of the walking motor 123. This coordinate system rotates synchronously with the rotor. The direction of the rotor magnetic field is the direct axis, and the direction perpendicular to the rotor magnetic field is the quadrature axis. The direct axis target current id0 and the direct axis are in the same direction, the quadrature axis target current iq0 and the quadrature axis are in the same direction, wherein the quadrature axis target current iq0 is the excitation current, which is used to control the torque and generate a torque perpendicular to the rotor to drive the rotor to rotate. The quadrature axis target current iq0 and the direct axis target current id0 can be obtained by calculation, or can be set directly.

When a voltage is applied to the walking motor 123, the stator can generate current, so that the walking motor 123 generates electromagnetic torque Te. The electromagnetic torque Te of the walking motor 123 can be obtained by the following formula:

$$Te = 1.5 P_n [\Psi_f * iq0 + (Ld - Lq) * id * iq] \quad (1)$$

wherein $\Psi f$ is the rotor flux linkage, iq is the quadrature axis current, id is the direct axis current, Ld is the direct axis inductance of the stator windings, Lq is the quadrature axis inductance of the stator windings, Pn is the number of magnetic pole pairs, and $\Psi f$ is the flux linkage constant of a walking motor 123.

The control module 124 can control the current loaded on the stator by controlling the three-phase voltage Uu, Uv, Uw loaded on the walking motor 123 according to the rotational speed of the walking motor 123, the current of the walking motor 123, and the position of the rotor to make the stator windings generate a stator current space vector is0; the stator current space vector is0 and the stator flux linkage space vector $\Psi s$ are of the same direction, and the stator current space vector is0 is the target current is0. The target current is0 as mentioned above can be distributed by the current distribution unit 1242 as the direct axis target current id0 and the quadrature axis target current iq0. The control module 124 can control the angle β between the stator flux linkage $\Psi s$ and the rotor flux linkage $\Psi f$ by separately controlling the quadrature axis current iq and the direct axis current id, so as to change electromagnetic torque Te output by walking motor 123, and thereby, to control the acceleration of the walking motor, including starting acceleration and braking acceleration. In this way, under different starting modes, output different starting accelerations; and under different braking modes, output different braking accelerations.

The direct axis target current id0 and the quadrature axis target current iq0 distributed by the current distribution unit 1242 according to the target current is0 can cause the rotor of the walking motor 123 to generate different electromagnetic torque Te, so that the walking motor 123 can reach the target rotational speed n0 of the walking motor 123 set by the user by the operating mechanism 131 in different accelerations. Different accelerations include starting accelerations and braking accelerations.

The current transformation unit 1247 obtains the three-phase currents iu, iv, and iw, and performs current transformation to convert the three-phase currents iu, iv, and iw into two-phase currents, which are the direct axis actual current id and the quadrature axis actual current iq, respectively. The current detection module 29 transmits the detected three-phase currents iu, iv, and iw in the actual operation of the walking motor 123 to the current transformation unit 1247 in the control module 124. Optionally, the current transformation unit 1247 includes Park conversion and Clark conversion.

The first current loop 1243 is connected to the current distribution unit 1242 and the current transformation unit 1247 to obtain the direct axis target current id0 and the direct axis actual current id and generate a first voltage adjustment amount Ud according to the direct axis target current id0 and the direct axis actual current id. The first voltage adjustment amount Ud can make the direct axis actual current id approach the direct axis target current id0 as soon as possible. The first current loop 1243 includes a comparison and adjustment unit, the adjustment unit may be PI adjustment, and the first current loop 1243 includes comparing the direct axis target current id0 and the direct axis actual current id and performing the PI adjustment according to the comparison result to generate the first voltage adjustment amount Ud.

The second current loop 1244 is connected with the current distribution unit 1242 and the current transformation unit 1247 to obtain the quadrature axis target current iq0 and the quadrature axis actual current iq and generate a second voltage adjustment amount Uq according to the quadrature axis target current iq0 and the quadrature axis actual current iq. The second voltage adjustment amount Uq can make the quadrature axis actual current iq approach the quadrature axis target current iq0. The second current loop 1244 includes a comparison and adjustment unit, the adjustment unit may be PI adjustment, and the second current loop 1244 includes comparing the quadrature axis target current iq0 and the quadrature axis actual current iq and performing the PI adjustment according to the comparison result to generate the second voltage adjustment amount Uq.

The above-mentioned first voltage adjustment amount Ud and second voltage adjustment amount Uq need to be converted into control signals for controlling the drive circuit 127 after some transformation and calculation. The first voltage adjustment amount Ud and the second voltage adjustment amount Uq are sent to the control signal generation unit for transformation and calculation. In this example, the control signal generation unit includes a voltage transformation unit 1245 and a PWM signal generation unit 1246.

The voltage transformation unit 1245 is connected to the first current loop 1243 and the second current loop 1244 to obtain the first voltage adjustment amount Ud and the second voltage adjustment amount Uq, and the position of the rotor of the walking motor 123 from the rotor position detection module 26, and convert the first voltage adjustment quantity Ud and the second voltage adjustment quantity Uq into intermediate amounts Ua and Ub related to the three-phase voltage Uu, Uv, Uw applied to the walking motor 123, and output them to the PWM signal generation unit 1246. The PWM signal generation unit 206 generates PWM signals for controlling the switching elements of the driving circuit 127 according to the intermediate amounts Ua and Ub, so that the power supply assembly 14 can output three-phase voltages Uu, Uv, Uw to be applied to the windings of the walking motor 123. Uu, Uv, Uw are three-phase symmetrical sine wave voltages or saddle wave voltages, and the three-phase voltages Uu, Uv, Uw form a 120° phase difference with each other. Optionally, the voltage transformation unit 1245 includes Park inverse transform and Clark inverse transform.

Using the above-mentioned control module 124, this example adopts the following control methods:

The current transformation unit 1247 obtains the three-phase currents iu, iv, iw detected by the current detection module 29 and the rotor position information detected by the rotor position detection module 26 and performs current transformation to convert the three-phase currents iu, iv, iw into two-phase currents, which are the direct axis actual current id and the quadrature axis actual current iq, respectively. The first current loop 203 obtains the above-mentioned direct axis target current id0 and direct axis actual current id and generates the first voltage adjustment amount Ud according to the direct axis target current id0 and the direct axis actual current id. The second current loop 204 obtains the above-mentioned quadrature axis target current iq0 and quadrature axis actual current iq and generates the second voltage adjustment amount Uq according to the quadrature axis target current iq0 and the quadrature axis actual current iq. The voltage transformation unit 1245 obtains the first voltage adjustment amount Ud, the second voltage adjustment amount Uq, and the rotor position from the rotor position detection module 26 and converts the first voltage adjustment amount Ud and the second voltage adjustment amount Uq into intermediate amounts Ua and Ub related to the three-phase voltages Uu, Uv, Uw applied to the walking motor 123, and outputs them to the PWM signal generation unit 1246. The PWM signal generation unit 206 generates PWM signals according to the intermediate amounts Ua and Ub for controlling the switching elements of the drive circuit 127, thereby the power supply assembly 14 outputs three-phase voltages Uu, Uv, and Uw to be applied to the windings of the walking motor 123. In this example, the three-phase voltages Uu, Uv, and Uw are three-phase symmetrical sine wave voltages or saddle wave voltages, and the three-phase voltages Uu, Uv, and Uw form a 120° phase difference with each other.

Referring to FIG. 14, the riding lawn mower 100 further includes a feedback circuit 28 for feeding back the electric energy generated by the walking motor 123 to the power supply assembly 14 during the braking process of the walking motor 123. For example, when the walking motor 123 is braking, reduce the speed of the walking motor 123 so that the walking control module 124 outputs a negative current torque component by adjusting the corresponding walking motor 123. At this time, the walking motor 123 outputs a negative torque and generates electricity. The current generated by the walking motor 123 is fed back to the power supply assembly 14 through the feedback circuit 28.

Optionally, the feedback circuit 28 includes a power supply voltage detection module 281 for detecting the voltage of the battery packs 141. The walking control module 124 is configured to: obtain the voltage detection value from the power supply voltage detection module 281; when the voltage detection value is greater than or equal to a predefined threshold, cut off the electrical connection between the walking motor 123 and the power supply assembly 14. Optionally, the predefined threshold is the rated voltage of the battery packs. In other words, when it is detected that one or more battery packs 141 are substantially fully charged, i.e., in a fully charged state, the electrical connection between the walking motor 123 and the power supply assembly 14 is cut off. In this way, the current generated by the braking of the walking motor 123 will not be used for the battery packs 141 that are basically fully charged, i.e., in a fully charged state, so as to prevent the battery packs 141 from being overcharged.

In some specific examples, the walking control module 124 is configured to: cut off the electrical connection between the walking motor 123 and the battery packs 141, and short-circuit the windings of the walking motor 123; that is, control the drive circuit 127 through the walking control module 124 to turn on all upper bridge switching elements (VT1, VT3, VT5) or all lower bridge switching elements (VT2, VT4, VT6), so that the ends of the phase windings connected to the neutral point are connected to each other, so that the windings of each phase are short-circuited. In this way, the resistance of the windings is used to consume electric energy, so that the electric energy generated by the walking motor 123 will not damage other electronic components.

In a specific example, the feedback circuit 28 includes at least one electronic switch, which is connected between the power supply assembly 14 and the drive circuit 127. When the voltage detection value detected by the power supply voltage detection module 281 exceeds the predefined threshold, the walking control module 124 controls the electronic switch to turn off. In some examples, the feedback circuit 28 includes an electronic switch Q2.

Optionally, the riding lawn mower 100 further includes a first electronic switch Q1, a second electronic switch Q2, and a unidirectional diode D1. Wherein, the first electronic switch Q1 and the second electronic switch Q2 are connected in series between the power supply assembly 14 and the drive circuit 21, and the unidirectional diode D1 is connected in parallel with the first electronic switch. The unidirectional diode D1 is configured to allow the current from the walking motor 123 flow to the power supply assembly 14.

When the power supply assembly 14 is required to supply power to the walking motor 123, the first electronic switch Q1 and the second electronic switch Q2 are both turned on, and the power supply assembly 14 can supply power to the walking motor 123 through the first electronic switch Q1 and the second electronic switch Q2. When braking, the first electronic switch Q1 is turned off, whereas the second electronic switch Q2 is kept on. The current generated by the walking motor 123 can flow to the power supply assembly 14 through the second electronic switch Q2 and the unidirectional diode D1. When the voltage of one or more battery packs detected by the power supply voltage detection module 281 exceeds the predefined threshold, the second electronic switch Q2 is turned off to cut off the electrical connection between the battery pack 141 and the walking motor 123, so that the current generated by the walking motor 123 no longer flows to the power supply assembly 14.

Optionally, the feedback circuit 28 further includes a power supply current detection module 282 for detecting whether there is current flowing from the walking motor 123 to the power supply assembly 14. The walking control module 124 is configured to: obtain the voltage detection value from the power supply voltage detection module 281; determine whether there is a current flowing from the walking motor 123 to the power supply assembly 14; if the voltage detection value is greater than or equal to a predefined threshold and there is a current flowing from the walking motor 123 to the power supply assembly 14, cut off the electrical connection between the walking motor 123 and the power supply assembly 14. Optionally, when the electrical connection between the walking motor 123 and the power supply assembly is cut off, short-circuit the windings of the walking motor 123. By adding the power supply current detection module 282 to determine whether the walking motor 123 is in the braking state or the driving state, the walking motor 123 is prevented from accidentally entering the energy recovery state in the driving state.

In some specific examples, the operating component 13 is at least used to output a parking signal to trigger the riding lawn mower 100 to enter the parking mode. For example, the operating component 13 is also used to output an acceleration signal to trigger the riding lawn mower 100 to exit the parking mode. The operating component 13 can also be used for the user to set the target speed and the traveling direction of the riding lawn mower 100. In other words, the operating component 13 can be operated for the user to set the walking state of the riding lawn mower 100 and to trigger the riding lawn mower 100 to enter and exit the parking mode.

In some examples, the operating component 13 includes a brake pedal 136 for the user to perform brake control on the riding lawn mower 100. Optionally, the brake pedal 136 can output a parking signal to trigger the riding lawn mower 100 to enter the parking mode when it is stepped on.

In some examples, the operation sensing module 132 is configured to detect the position of the operating lever 131 and send the detected position information of the operating lever 131 to the walking control module 124. The walking control module 124 obtains the target speed and direction of rotation of the walking motor 123 corresponding to the detected position of the operating lever 131 through calculation or lookup table, as well as commands on entering and exiting the parking mode.

For example, when the user pushes the operating lever 131 forward to reach a certain position, based on the position reached by the forward movement of the operating lever 131 as detected by the operation sensing module 132, the walking control module 124 obtains the forward rotational speed of the walking motor 123 by lookup table. When the user pushes the operating lever 131 backward to reach a certain position, based on the position reached by the backward movement of the operating lever 131, as detected by the operation sensing module 132, the walking control module 124 obtains the reverse rotational speed of the walking motor 123 by lookup table.

The walking control module 124 controls the rotational speed and steering of the walking motor 123 according to the position information of the operating lever 131. The walking motor 123 drives the second walking wheel 122 to rotate, thereby controlling the traveling direction, traveling speed, entering and exiting the parking mode of the riding lawn mower 100, so as to allow the user to control the walking of the riding lawn mower 100. Optionally, the operating component 13 may also be implemented as other control devices such as pedals, switches, handles, etc., which allow the user to operate the riding lawn mower 100. The operating component 13 may also be a control panel, which includes a plurality of switches, wherein different switches correspond to different control commands. The user inputs different control commands through the switches to control the walking motor 123 of the walking assembly 12.

The walking control module 124 is configured to control the running process of the walking motor 123. In some examples, the walking control module 124 adopts a dedicated controller, such as some dedicated control chips (for example, MCU, Microcontroller Unit). The power supply circuit 145 is connected to the power supply assembly 14, and the power supply circuit 145 is configured to receive the power from the power supply assembly 14 and convert the power from the power supply assembly 14 into the power at least used by the walking control module 124.

Optionally, the riding lawn mower 100 further includes a drive circuit 127. The drive circuit 127 is electrically connected to the walking control module 124 and the walking motor 123, which controls the walking motor 123 to operate based on the control signals output from the walking control module 124. In an example, the walking motor 123 is a three-phase motor with three-phase windings, and the drive circuit 21 is electrically connected to the three-phase windings of the walking motor 123. The drive circuit 127 includes power switches, which turn on and off the electrical connection between the power supply assembly 14 and the walking motor 123, and also adjust the current output from the power supply assembly 14 to the walking motor 123 according to different control signals output by the walking control module 124.

The walking control module 124 is configured to output corresponding drive signals to the drive circuit 127 according to the position of the rotor 1231 of the walking motor 123 to switch the driving state of the drive circuit 127, thereby changing the voltage and/or current applied to the windings of the walking motor 123, so as to generate an alternating magnetic field to drive the rotor to rotate, thereby driving the walking motor 123.

The position of the rotor 1231 of the walking motor 123 can be obtained by the rotor position detection module 26. The rotor position detection module 26 may include sensors, for example, a plurality of Hall sensors, arranged along the circumferential direction of the rotor 1231 of the walking motor 123. When the rotor 1231 rotates into and out of a predefined range, the signals of the Hall sensors change, and the output signal of the rotor position detection module 26 also changes accordingly. In this way, the detected signal output by the rotor position detection module 26 can be used to determine the position of the rotor 1231 of the motor. Optionally, the position of the rotor 1231 can also be estimated based on the current of the motor.

The riding lawn mower 100 further includes a speed detection module 128, which is coupled with the walking motor 123 and configured to detect the actual rotational speed of the walking motor 123. Optionally, the speed detecting module 128 includes a speed detection sensor, which is disposed near or inside the walking motor 123 to obtain the actual speed of the walking motor 123; for example, a photoelectric sensor installed near the walking motor 123 to obtain the actual rotational speed of the walking motor 123; for another example, a Hall sensor arranged near the rotor inside the walking motor 123 to obtain the actual rotational speed of the walking motor 123 according to the rotational speed of the rotor.

However, in some cases, for example, the walking motor 123 operates at high speed and/or high temperature, or the second walking wheels 122 runs at high speed and/or high temperature, or the riding lawn mower operates at high temperature, the detection accuracy of the sensor will be affected, the speed detection sensor can even be invalid. Therefore, in order to solve this problem, in another implementation, the speed detection module 128 does not include a sensor, but through the electrical signal output by the walking motor 123. For example, by detecting the current of the walking motor 123, the periodic change of the walking motor 123 can be obtained from the zero-crossing point of the back electromotive force of the walking motor 123; thereby, the actual rotational speed of the walking motor 123 can be obtained. In this way, there is no need for a sensor to detect the actual rotational speed of the walking motor 123, which reduces cost, meanwhile, the detection accuracy is not affected by high speed or temperature, and the whole machine structure is more compact.

The riding lawn mower 100 has a parking mode, and the user sends a parking signal through the operating component 13 to trigger the riding lawn mower 100 to enter the parking mode. In the example that makes use of the operating lever 131, the user pushes the operating lever 131 to the parking position to issue a parking signal to trigger the parking mode. The operation sensing module 132 detects that the operation lever 131 is in the parking position, and the detected information is sent to the walking control module 124. The walking control module 124 controls the walking motor 123 to realize parking. In the example that two operating levers respectively control two walking motors 123, the user issues a parking command by pushing both operating levers 131 to the parking position.

The walking control module 124 is configured to: when the riding lawn mower 100 enters the parking mode, determine whether the rotational speed of the walking motor 123 is less than or equal to a predefined speed threshold; when it is determined that the rotational speed of the walking motor 123 is less than or equal to the predefined speed, a first torque that is opposite to the tendency of rotation of the walking motor 123 is applied to the walking motor 123. The first torque is configured to make the riding lawn mower stand still in one position, thereby realizing the automatic parking of the riding lawn mower. For example, the first torque is configured to make the riding lawn mower 100 stand still at the position when it enters the parking mode.

For example, when the riding lawn mower 100 is walking on a ramp, the riding lawn mower 100 is subjected to a vertically downward gravity force, which causes the riding lawn mower 100 to have a tendency to slide down the ramp. If the user sends a parking signal through the operating component 13, the riding lawn mower 100 enters the parking mode, and the walking motor 123 performs mechanical or electronic braking to decelerate, or the walking motor 123 stops freely to decelerate. The speed detection module 128 detects and sends the actual rotational speed of the walking motor 123 to the walking control module 124. When it is determined that the actual rotational speed of the walking motor 123 is less than or equal to the predefined speed threshold, that is, after the rotational speed of the walking motor 123 drops to a certain value, the walking control module 124 applies a first torque that is opposite to the tendency of rotation of the walking motor 123. The first torque has equal magnitude and opposite direction to the external force torque of the riding lawn mower 100 that causes the riding lawn mower 100 to have a tendency to slide. In the example in which the riding lawn mower 100 enters the parking mode while walking on the ramp, the direction of the first torque is upward along the ramp. In this way, due to the balance of torque, the walking motor 123 will eventually be locked in a certain position, so that the riding lawn mower 100 is stationary in one position. For example, the first torque is configured to make the riding lawn mower 100 stand still at the position when it enters the parking mode.

Optionally, after determining that the rotational speed of the walking motor 123 is less than or equal to the predefined speed threshold, the walking control module 124 controls the power supply assembly 14 to output a first current to the walking motor 123, and the first current causes the walking motor 123 to generate the first torque. In an example, the walking control module 124 outputs a control signal to the drive circuit 21, and the drive circuit 127 adjusts the magnitude and direction of the first current, so that the walking motor 123 generates the first torque.

In a specific implementation, the walking control module 124 is configured to: after determining that the rotational speed of the walking motor 123 is less than or equal to the predefined speed threshold, the rotor position detection module detects the current position of the rotor 1231 of the walking motor 123, the walking control module 124 selects the current position of the rotor 1231 of the walking motor 123 as the reference position. In this way, when the rotor 1231 deviates from the reference position, the walking control module 124 can compare the deviated position of the rotor 1231 with the reference position to determine the direction in which the rotor 123 deviates from the reference position, thereby determining the tendency of rotation of the walking motor 123, and the tendency of slide of the riding lawn mower 100.

After the rotor 1231 deviates from the reference position, the power supply assembly 14 is controlled to output the first current to the walking motor 123 to cause the walking motor 123 to generate the first torque. The first torque is configured to return the rotor 1231 of the walking motor 123 back to the reference position, thereby making the riding lawn mower 100 to stand still at one position, for example, the riding lawn mower 100 can stand still at the position when the riding lawn mower 100 enters the parking mode.

The operating component 13 is also used to output an acceleration signal to trigger the riding lawn mower to exit the parking mode. The walking control module 124 is configured to: after the operating component 13 sends out the acceleration signal, determine whether the direction of the second torque to be generated by the walking motor 123 corresponding to the acceleration signal is the same as the direction of the first torque; if the direction of the second torque is the same as the direction of the first torque, then determine whether the second torque is greater than or equal to the first torque; if it is determined that the second torque is greater than or equal to the first torque, control the riding lawn mower 100 to exit the parking mode.

In other words, if you want the riding lawn mower 100 to start walking again, you need to operate the operating component 13 to input an acceleration signal. If the direction of acceleration is the same as the direction of the current parking torque of the walking motor 123, this acceleration signal is not used directly to control the operation of the walking motor 123, but the second torque corresponding to the acceleration signal needs to be calculated. If the second torque is greater than or equal to the first torque for parking the riding lawn mower 100, the parking mode is exited and the walking motor 123 is controlled to operate according to the acceleration signal. If the second torque is less than the first torque, remain in the parking mode. The advantage is: the riding lawn mower 100 can only be released from the parking mode when the acceleration torque can overcome the external force that causes it to slide downward, so as to prevent the riding lawn mower 100 from sliding down the ramp due to insufficient acceleration torque.

The operating component 13 is also used to set the target speed of the walking motor 123. After exiting the parking mode, the walking control module 124 controls the walking motor 123 to run at the target speed according to the target speed set by the operating component 13.

In an example, when the direction of the second torque is opposite to the direction of the first torque, that is, when the user expects the riding lawn mower 100 to walk downhill, there are two cases including uphill parking and reversing, and downhill parking and forwarding. In both cases, the direction of the first torque for parking is upward, and the direction of the second torque corresponding to the acceleration signal is downward, that is, the direction of the second torque is opposite to the direction of the first torque. In this case, the walking control module 124 can control the riding lawn mower 100 to directly exit the parking mode to control the riding lawn mower 100 according to the target speed and direction set by the operating component.

In another example, using the operating lever 131, when the direction of the second torque direction is opposite to the first torque, the parking mode is not directly exited. It is also necessary to determine whether the change of position after leaving the parking position reaches a predefined threshold, and if so, exit the parking mode; if not, remain in the parking mode. The advantage is to prevent exiting the parking mode due to wrong operations by the driver, wherein frequent start and jitter of the riding lawn mower 100 affects user experience and driving safety.

The operating lever 131 can be pushed to the parking position to send out the parking signal and to leave the parking position to send out the acceleration signal. Optionally, when the operating lever 131 is opened outward in the left and right direction of the driver, the current state of the operating lever 131 represents the parking signal. When the operating lever 131 is restored from the outwardly opened position to the neutral position or any position of the forward position or the reverse position, the current state of the operating lever 131 represents an acceleration signal.

In this example, if the change of position of the operating lever 131 after leaving the parking position reaches the predefined threshold, the riding lawn mower 100 is controlled to exit the parking mode. For example, if the operating lever 131 reaches any speed position of the forward position or the reverse position from the parking position, if the angle change of the operating lever 131 reaches a predefined threshold, the riding lawn mower 100 is controlled to exit the parking mode; if the angle change of the operating lever 131 does not reach the predefined threshold, the riding lawn mower 100 is still maintained in the parking mode.

When the riding lawn mower 100 is parked on a flat ground, it can still be parked according to the parking control method described above, and the first torque applied to the walking motor is zero at this time.

Figure 17:
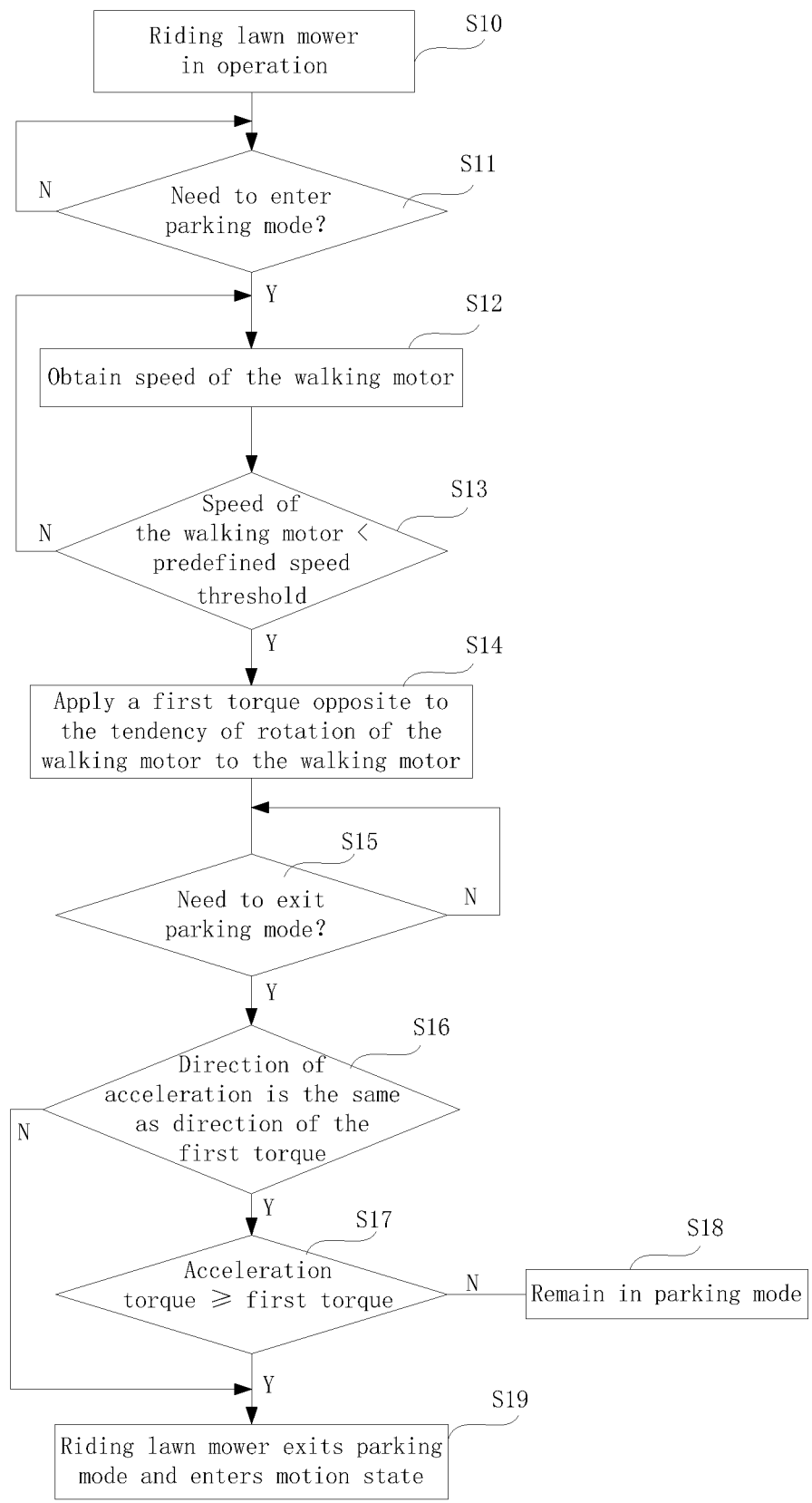
FIG. 17 is a flowchart of a control method of the riding lawn mower according to an example.

Referring to FIG. 17, a control method of the riding lawn mower 100 includes:

Step S10: the riding lawn mower is in operation;

The walking control module 124 controls the riding lawn mower 100 to operate normally, for example, uphill or downhill.

Step S11: determine whether the riding lawn mower needs to enter the parking mode;

For example, when parking is needed, the user sends a parking signal by operating the operating component 13 to trigger the riding lawn mower 100 to enter the parking mode. As described above, in the example using the operating lever 131, the user sends a parking signal to trigger the parking mode by pushing the operating lever 131 to the parking position. The operation sensing module 132 detects that the operating lever 131 is in the parking position and sends the detected position information to the walking control module 124. The walking control module 124 controls the walking motor 123 to realize parking. In the example in which two operating levers control two walking motors 123 respectively, the user issues a parking command by pushing both operating levers 131 to the parking position. If the operation sensing module 132 does not detect the parking signal that the riding lawn mower 100 needs to enter the parking mode, then go to step S11, and the riding lawn mower 100 continues to maintain the operation state.

Step S12: obtain the rotational speed of the walking motor;

When it is determined that the riding lawn mower 100 needs to enter the parking mode, the speed detection module 128 detects the rotational speed of the walking motor and sends it to the walking control module 124, and the walking control module obtains the detected rotational speed of the walking motor 123.

Step S13: determine whether the rotational speed of the walking motor is less than or equal to a predefined speed threshold.

The walking control module 124 compares the rotational speed of the walking motor 123 detected by the speed detection module 128 with the predefined speed threshold to determine whether the rotational speed of the walking motor 123 is less than or equal to the predefined speed threshold. If it is determined that the rotational speed of the walking motor 123 is greater than or equal to the predefined speed threshold, then go to step S12 to continue to obtain the rotational speed of the walking motor 123 and determine whether the rotational speed is less than or equal to the predefined speed threshold.

Step S14: apply a first torque that is opposite to the tendency of rotation of the walking motor to the walking motor, wherein the first torque is configured to make the riding lawn mower to stand still in one position.

After determining that the rotational speed of the walking motor 123 is less than or equal to the predefined speed threshold, apply a first torque that is opposite to the tendency of rotation of the walking motor to the walking motor. For example, the walking control module 124 outputs a control signal to the drive circuit 127, and the drive circuit 127 adjusts the magnitude and direction of the first current, so that the walking motor 123 generates the first torque. The first torque has equal magnitude and opposite direction to the external force torque of the riding lawn mower 100 that causes the riding lawn mower 100 to have a tendency to slide. The first torque is configured to make the riding lawn mower to stand still in one position.

Step S15: determining whether the riding lawn mower needs to exit the parking mode;

For example, when it is necessary to exit the parking mode and move forward or backward, the user sends an acceleration signal by operating the operating component 13 to trigger the riding lawn mower 100 to exit the parking mode. In the example using the operating lever 131, the user triggers the riding lawn mower 100 to exit the triggered parking mode by pushing the operating lever 131 forward to a certain position or backward to a certain position from the parking position. The operation sensing module 132 detects that the operating lever 131 leaves the parking position to settle in another position and sends the detected position information to the walking control module 124. The walking control module 124 obtains the rotational direction and rotational speed of the walking motor corresponding to the current position of the operation lever 131 by lookup table or calculation according to the detected position information of the operation lever 131. If the signal that the riding lawn mower 100 needs to exit the parking mode is not detected, then go to step S15 to continue to determine whether the riding lawn mower 100 needs to exit the parking mode, while the riding lawn mower 100 remains in the parking mode.

Step S16: determine whether the direction of acceleration is the same as the direction of the first torque;

The acceleration signal sent by the user through the operating component 13 includes setting the target direction and target speed of the walking motor 123, thereby controlling the riding lawn mower 100 to operate in accordance with the set target direction and target speed of the walking motor 123. The acceleration signal corresponds to the second torque that the walking motor 123 needs to generate, wherein the second torque enables the riding lawn mower 100 to quickly reach the traveling speed of the walking motor 123 that the user sets. The walking control module 124 can obtain the state of the operating component 13 to decide the direction of acceleration of the riding lawn mower 100 according to the state of the operating component and determine whether the direction of acceleration of the riding lawn mower 100 is the same as the direction of the first torque. If yes, then go to step S17, otherwise go to step S18 to exit the parking mode directly. In the example using the operating lever 131, the walking control module 124 obtains the target speed and target direction of the walking motor 123 corresponding to the current position of the operating lever 131 as detected by the operation sensing module 132 and determines the direction of acceleration according to the target speed and target direction.

Step S17: determine whether the acceleration torque is greater than or equal to the first torque;

The walking control module 16 can calculate an acceleration torque according to the above-mentioned target speed of the walking motor 123 set by the operating component 13, and the acceleration torque is the second torque. The walking control module 124 determines whether the acceleration torque is greater than or equal to the first torque. If the acceleration torque is greater than or equal to the second torque, then go to step S19; otherwise, go to step S18 to keep the riding lawn mower 100 in the parking mode.

Step S18: remain the parking mode.

If it is determined that the acceleration torque is less than the first torque, the riding lawn mower 100 is kept in the parking mode.

Step S19: the riding lawn mower exits the parking mode.

If it is determined that the acceleration torque is greater than or equal to the first torque, the riding lawn mower exits the parking mode, and the walking control module 124 controls the target speed and direction of the operation of the walking motor 123 according to the target speed and direction of the walking motor 123 set by the operating component 13.

Figure 2:
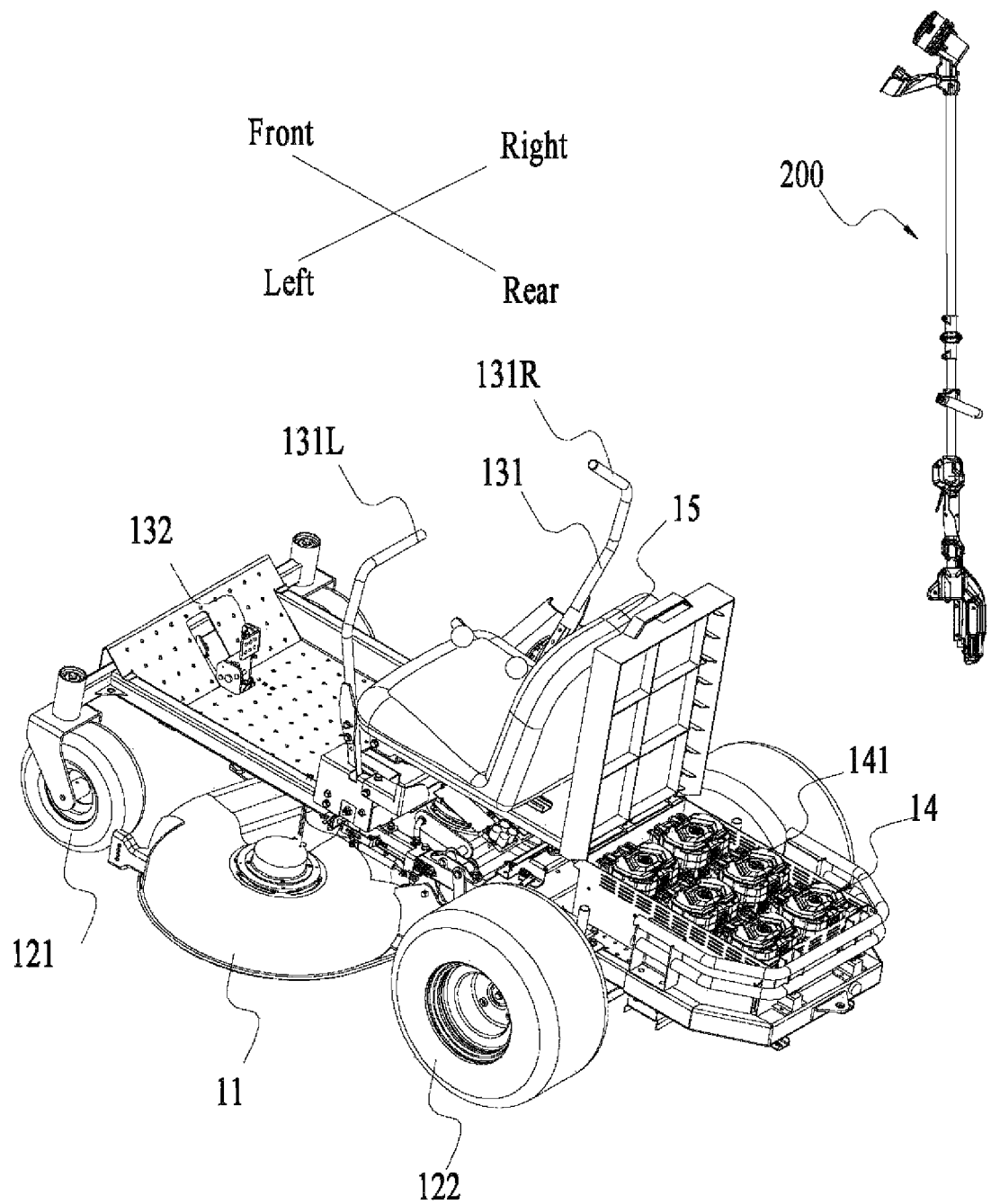
FIG. 2 is an external view of the riding lawn mower from another perspective.
Figure 18:
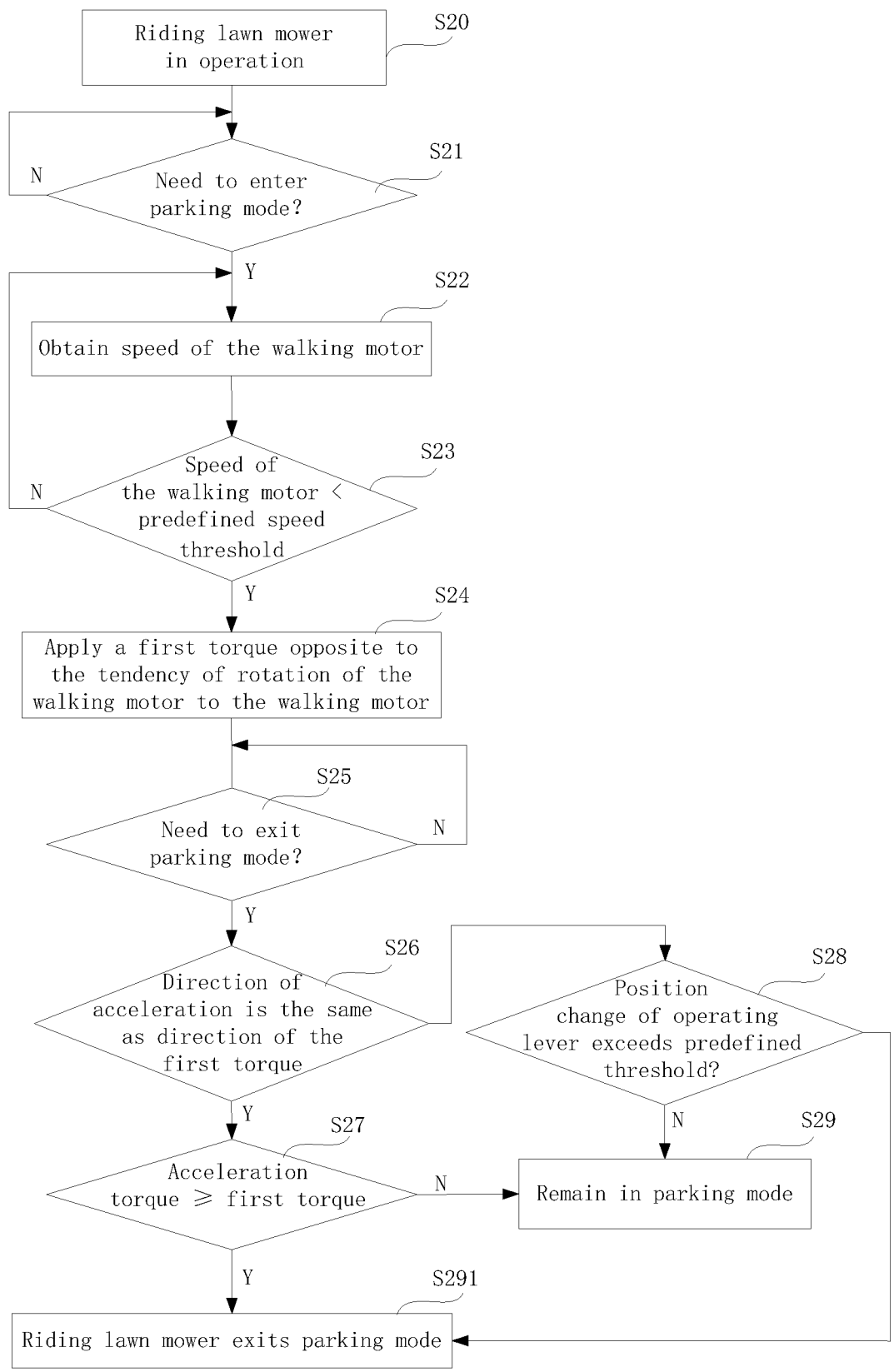
FIG. 18 is a flowchart of a control method of the riding lawn mower according to another example.

Referring to FIG. 18, in another example of the control method of the riding lawn mower, the operating component 13 of the riding lawn mower 100 includes an operating lever 131, wherein the lever 131 may be a hand push operating lever as shown in FIGS. 1-2, or a foot-stepping accelerator pedal, or a forward pedal and a reverse pedal.

The control method of the riding lawn mower in this example includes the following steps, wherein steps S20 to S25 are the same as or similar to the foregoing example and will not be repeated herein. The difference is that, in the present example, after it is determined that the direction of acceleration is not the same as the direction of the first torque, i.e., the direction of the second torque corresponding to the acceleration signal is opposite to the direction of the first torque, instead of directly exiting the parking mode, a check needs to be performed to determine whether the change of position of the operating lever from the parking position exceeds a predefined threshold. The steps are as follows:

Step S20 to Step S25: the same as step S10 to step S15 and will not be repeated herein.

Step S26: determine whether the direction of acceleration is the same as direction of the first torque.

The acceleration signal sent by the user through the operating component 13 corresponds to the second torque that the walking motor 123 needs to generate, and the second torque can make the riding lawn mower 100 quickly reach the walking speed of the walking motor 123 that the user needs to set. The walking control module 124 can obtain the state of the operating component 13 to determine the direction of acceleration of the riding lawn mower 100 according to the state of the operating component and determine whether the direction of acceleration of the riding lawn mower 100 is the same as the direction of the first torque, if yes, go to step S27, otherwise go to step S28.

Step S27: determine whether the acceleration torque is greater than or equal to the first torque;

The walking control module 16 determines whether the acceleration torque is greater than or equal to the first torque. If the acceleration torque is greater than or equal to the first torque, go to step S30; otherwise, go to step S29 to keep the riding lawn mower 100 in the parking mode.

Step S28: determine whether the change of position of the operating lever exceeds a predefined threshold;

If it is determined that the direction of acceleration is not the same as the direction of the first torque, that is, the direction of the second torque corresponding to the acceleration signal is opposite to the direction of the first torque, it is determined whether the change of position of the operating lever 131 from the parking position exceeds the predefined threshold, if yes then go to step S30, exit the parking mode, if not, go to step S29, remain in the parking mode.

Step S29: remain in the parking mode.

Step S291: the riding lawn mower exits the parking mode.

The riding lawn mower exits the parking mode, the walking control module 124 controls the the target speed and direction of the operation of the walking motor 123 according to the target speed and direction of the walking motor 123 set by the operating component 13.

The riding lawn mower 100 of the present application will slide down when starting up upwards on the ramp, which improves driving safety of the riding lawn mower, and also prevents frequent start due to touching the operating lever by mistake when starting up downwards on the ramp, thereby reducing jitter and improving user experience and driving safety.

In some cases, the riding lawn mower 100 only needs to brake and decelerate without parking, and in other cases, the automatic parking function is triggered after the braking deceleration reaches a certain speed threshold. The riding lawn mower 100 of the present application has at least two different braking modes, which can adapt to different situations, providing a good user experience and better safety.

In some examples, the walking control module 124 of the riding lawn mower 100 is also used to control the braking of the walking motor 123. For example, when the walking control module 124 receives a brake signal for triggering braking, it controls the walking motor 123 to brake. There are many kinds of brake signals, and there are many kinds of braking modes.

In some examples, the riding lawn mower 100 includes a brake pedal 136 for triggering the brake of the walking motor 123 of the riding lawn mower. Is an example, the user depresses the brake pedal to trigger the braking mode, optionally, the brake pedal is provided with a sensor, which can feel the step pressure from the user. When a user depresses the brake pedal 136 of the riding lawn mower 100, the riding lawn mower 100 enters the braking mode, and the walking control module 124 controls the walking motor 123 to brake and decelerate. For example, the walking control module 124 controls the windings 242 of the walking motor 123 to be short-circuited to achieve braking. In another example, the brake pedal 136 is directly coupled with the walking motor 123. Optionally, the brake pedal 136 is coupled with a friction member. When the brake pedal 136 is stepped on, the friction member is brought into contact with the walking motor 123, so that the walking motor 123 decelerates.

In some examples, the brake pedal 136 is coupled with a signal switch. The signal switch is disposed at the bottom of the brake pedal 136. When the brake pedal 136 is depressed to the end, the signal switch provided at the bottom of the brake pedal 136 is triggered to change state, thereby generating a parking signal. Upon receiving the parking signal, the walking control module 124 controls the walking motor 123 to park using the aforementioned parking method. Optionally, after the brake pedal 136 is stepped on to enter the braking mode, when the speed of the walking motor 123 approaches zero, the aforementioned parking mode is triggered, and the riding lawn mower 100 enters the aforementioned parking mode.

Optionally, the riding lawn mower 100 includes a sensor for detecting the amount of change in the position or angle of the brake pedal 136 before and after being depressed, for example, the pivot angle of rotation of the brake pedal 136, or a sensor for detecting the position of the brake pedal 136 after being depressed. The riding lawn mower 100 further includes a friction plate and a third motor that drives the friction plate. The friction plate is arranged near the walking motor 123, and the friction plate can be driven by the third motor to move to rub against the walking motor to decelerate the walking motor to achieve braking. Optionally, the amount of change in the position or angle before and after the brake pedal 136 is depressed is proportional to the rotational speed or torque of the third motor. The third motor drives the friction plate to move according to the amount of change in the position or angle before and after the brake pedal 136 is depressed, which is detected by the position sensor, to decelerate the walking motor 123.

In some examples, the riding lawn mower 100 includes a power detection module for detecting the remaining power of the power supply assembly 14. When the remaining power is detected to be lower than a predefined power threshold, a brake signal is generated, the riding lawn mower 100 enters the braking mode, and the walking control module 124 controls the walking motor 123 to brake and decelerate. Optionally, the walking control module 124 controls the windings 242 of the walking motor 123 to be short-circuited to achieve braking. This braking method uses short-circuit current instead of the power from the power supply assembly to generate braking torque, therefore, it saves electric energy and achieves reliable braking.

In some examples, the riding lawn mower 100 includes a key socket for inserting a key to start the riding lawn mower 100. Optionally, when the key is pulled out from the key socket, the walking motor 124 starts to decelerate. For example, the walking control module 124 controls the drive circuit 127 to turn off the electrical connection between the power supply assembly 14 and the walking motor 123 to make the walking motor 123 freely decelerate and stop. Optionally, at this time, the walking control module 124 still maintains a charged state and enters a low power consumption mode.

In some examples, the riding lawn mower 100 includes a seat trigger. The seat trigger may be a signal switch, a capacitive sensor, a photoelectric switch, etc., arranged near the seat 15 and for sensing whether the user gets up and leaves the seat 15. When the user gets up and leaves the seat 15, the seat trigger can be triggered to change state, thereby triggering the riding lawn mower 100 to enter the braking mode.

The seat trigger has a first state and a second state. When the seat trigger is in the first state, the seat 15 bears a weight greater than a first predefined weight, and when the seat trigger is in the second state, the seat 15 bears a weight less than a second predefined weight. The first predefined weight is greater than or equal to the second predefined weight. Optionally, the first predefined weight may be a person's weight, and the second predefined weight is one-fifth of the first predefined weight. When the seat 15 bears a weight greater than the first predefined weight, it means that the operator is sitting on the seat 15, and when the seat 15 bears a weight less than the second predefined weight, it means that the operator gets up and leaves the seat 15.

The walking control module 124 is configured to control the walking motor 123 to brake when the seat trigger changes from the first state to the second state. In other words, when the user gets up and leaves the seat, the walking motor 123 must brake and slow down, so that the riding lawn mower 100 can stop. For example, the walking control module 124 controls the windings of the walking motor 123 to be short-circuited or controls the drive circuit 127 to control the braking current and braking time.

Optionally, the walking control module 124 can receive information about the status change of the seat trigger, and the walking control module 124 is configured to: When the seat trigger is changed from the first state to the second state and the time period in the second state is less than a predefined time period, the walking motor 123 is controlled to delay braking. For example, the walking motor 123 can be controlled to delay braking by means of a delay circuit, which can prevent the operator from changing the state of the seat trigger only due to bumps or moving the body, so that the walking control module 124 does not control the walking motor 123 due to undesirable brakes. The predefined weight may also be other weights set by the user. In this way, an operator sitting on the seat can be distinguished from an object placed on the seat.

In some examples, the operating component 13 of the riding lawn mower 100 includes a left operating lever 131L and a right operating lever 132R, and a position sensor for sensing the positions of the left operating lever 131L and the right operating lever 132R). Optionally, different braking effects occur when the operating levers 131 are on the inner and outer sides in the left and right direction. For example, when the user sits on the seat 15, and simultaneously pushes the two operating levers 131 outward to the maximum inner position in the left and right direction, the riding lawn mower is triggered to enter the above parking mode, that is, the walking control module 124 controls the walking motor 123 to brake or decelerate freely and enter the parking mode. When the user moves pushes the operating lever 131 from the forward position or the reverse position to the maximum inner position in the left and right direction, this position is also the middle position of the forward position and the reverse position. At this time, the riding lawn mower 100 enters the braking mode and decelerates. At this time, the walking control module 124 controls the walking motor 123 to brake or decelerate freely, without entering the parking mode.

In another example, the chassis 16 is configured to carry the seat 15, and the chassis 16 extends at least partially in a direction parallel to the front and rear direction. The seat 15 is used for the operator to sit on, and the seat 15 is mounted on the chassis 16. The seat 15 includes a seat base 151 and a seat back 152. The seat base 151 extends in the front and rear direction, and the seat back 152 extends upward from the base.

In another example, the operating component 13 may also be implemented as a switch, a handle, and other control devices for the user to operate the riding lawn mower 100. Therefore, the operating component may also include a control panel, which is provided with a plurality of switches, and different switches correspond to different control instructions, and the user inputs different control instructions through the switches to control the walking motor 123 of the walking assembly 12.

In another example, the operating component 13 may further include a weight sensor 138 for detecting whether the user is seated and generating a first signal or a second signal according to the weight of the user when the user is seated. The weight sensor 138 is communicationally connected with the walking control module 124. When the weight sensor 138 senses that the weight is lower than a predefined weight value, the weight sensor 138 sends a second signal to the walking control module 124 to prohibit the riding lawn mower from starting, and the walking control module 124 will prohibit the cutting motor 112 and the walking motor 123 from starting; on the contrary, when the weight sensor 138 senses that the weight reaches the predefined weight value, the weight sensor 138 sends a first signal to the walking control module 124, and the walking control module allows the cutting motor 112 and the walking motor 123 to start. In order to improve the accuracy of detecting whether the user is seated, multiple weight sensors 138 may be provided. For example, a plurality of weight sensors 138 are provided at different locations below the seat base 151, such as the center of the seat base 151 and the position of the seat base 151 near the front side. In other examples, the weight sensor 138 may also be provided at the seat back 152, so even if the user adjusts the posture to sit in the rearward position of the seat base 151, it can also be detected by the weight sensor 138. In this way, when the weight sensed by at least one weight sensor 138 reaches the predefined weight value, the walking control module 124 receives the first signal, and the cutting motor 112 and the walking motor 123 are allowed to start.

In addition, during the operation process of the riding lawn mower 100, the walking control module 124 is configured to control the walking motor 123 to brake when the weight sensor 138 senses that the weight is lower than the predefined weight value. In other words, when the user gets up and leaves the seat, the walking motor 123 must be brake and slow down, so as to stop the riding lawn mower 100. For example, the walking control module 124 controls the windings of the walking motor 123 to be short-circuited or controls the drive circuit 127 to control the braking current and braking time. In some examples, during the operation process of the riding lawn mower 100, when the weight sensor 138 senses that the weight is lower than the predefined weight value, the weight sensor 138 sends an automatic parking signal to trigger the automatic parking mode.

The setting of multiple weight sensors 138 can improve the accuracy of the riding lawn mower 100 in detecting whether the user is seated, and prevent the situation that a user with a small weight is unable to start the riding lawn mower when already seated but not recognized by the weight sensor 138; it can also avoid the situation that the walking control module 124 controls the walking motor 123 to brake due to misrecognition of a weight sensor 138 just because of bumps or moving the body. At the same time, make sure that the user is seated before starting the riding lawn mower. In this way, the safety of the user is guaranteed and the accuracy of the riding lawn mower in detecting whether the user is seated is also improved.

The brake assembly 40 is at least used for mechanical braking to prevent the walking wheels from moving relative to the chassis 16. In this example, the brake assembly includes a brake pedal 136 for triggering the riding lawn mower 100 to brake. In an example, the brake pedal 136 is provided with a pressure sensor, which can feel the user's stepping pressure. In another example, the brake pedal 136 is directly coupled with the walking motor 123. Optionally, the brake pedal 136 is coupled with a friction member. When the brake pedal 136 is stepped on, the friction member is brought into contact with the walking wheel, so that the walking wheel decelerates.

Wherein, the brake assembly 40 also includes a first signal switch. Optionally, the first signal switch is arranged at the bottom of the brake pedal 136. When the brake pedal 136 is stepped on to bring the pedal arm to a predefined position, the brake assembly 40 can be triggered to output a brake signal. When the brake pedal 136 is depressed to the predefined position, the signal switch provided at the bottom of the brake pedal 136 is triggered to change the state, thereby outputting a brake signal, and the second walking wheel brakes to stop quickly. In another example, the brake assembly 40 further includes a limiting member for preventing the brake pedal 136 from moving when the brake pedal 136 is depressed to a predefined position, so that the friction member coupled with the brake pedal 136 maintains the pressure against the walking wheel to prevent the walking wheel from moving relative to the chassis 16. When the brake pedal 136 is stepped on again, the limiting member releases the brake pedal 136 to restore the brake pedal 136 to its original position, so that the friction member is away from the walking wheel, so that the walking wheel can move freely.

Optionally, the riding lawn mower 100 further includes a power supply circuit 145. The power supply circuit 145 is connected to the power supply assembly 14. The power supply circuit 145 is configured to receive power from the power supply assembly 14 and convert the power of the power supply assembly 14 into the electric energy at least used by the walking control module 124.

In some examples, the riding lawn mower 100 further includes an operation panel 22. The operation panel 22 can display the remaining power of the power supply assembly 14 and the operating status information of the riding lawn mower 100 and is provided with a start button or a start switch for the user to control the start of the smart lawn mower. In some examples, the operation panel 22 is connected to the walking control module 124. When the user sends a start command through a button or a switch, the power supply assembly 14 receives and responds, so that the power supply assembly outputs electric energy to the cutting motor 112, the walking motor 123, and other electronic components of the riding lawn mower 100 to start the riding lawn mower 100. Optionally, the operating status information of the riding lawn mower includes the current mode of the riding lawn mower, such as: automatic parking mode, sleep mode, etc. The operating status information of the riding lawn mower may also include the current fault information of the riding lawn mower, etc. The operation panel 22 and the walking control module 124 are communicationally connected, and such a connection can be implemented in any suitable manner, including but not limited to a wired or wireless connection. The operation panel 22 can also be provided on a mobile terminal such as a mobile phone, and the user can monitor and control the riding lawn mower 100 through the mobile terminal such as a mobile phone, which improves usage convenience.

In some examples, in the example using the weight sensor 133, during the operation process of the riding lawn mower 100, when the user leaves the seat, the weight sensor 133 sends out an automatic parking signal to trigger the automatic parking mode, the walk control module 124 receives the automatic parking signal and controls the walking motor 123 to brake to realize automatic parking.

In some examples, if the walking control module 124 does not receive other control signals after the riding lawn mower 100 enters the automatic parking mode for a period of time, the riding lawn mower enters the sleep mode. For example, the power supply assembly 14 stops supplying power to the cutting motor 112, the walking motor 123, and other electronic components of the riding lawn mower 100, but still provides power to the operation panel 22, so the operation panel 22 can still display the remaining power of the power supply assembly 14. In an example, when the user triggers the start button or start switch of the operation panel 22 of the riding lawn mower 100, the power supply assembly 14 continues to supply power to the cutting motor 112, the walking motor 123, and other electronic components of the riding lawn mower 100, and the riding lawn mower 100 exits the sleep mode. In this way, the riding lawn mower 100 enters the sleep mode when not in use, which can save power and extend the power supply time of the power supply assembly.

However, the riding lawn mower 100 can stand still on the ramp through the automatic parking mode, If the riding lawn mower automatically enters the sleep mode and exits the automatic parking mode after a period of time, or the riding lawn mower is parked on the ramp for a long time through the automatic parking mode, and the power supply assembly 14 continues to provide power until it is completely discharged or the power is too low, the riding lawn mower 100 will be powered off. In this case, if the brake pedal 136 is not stepped on to the predefined position at this time, the walking wheels can move freely, which may cause the riding lawn mower 100 to slide and bring safety hazards.

Thus, in some examples, the riding lawn mower 100 further includes an alarm assembly 50. The alarm assembly 50 is connected with the walking control module 124 to issue an alarm under predefined conditions to alert the user.

In an example, the alarm assembly 50 at least includes a buzzer. When the riding lawn mower 100 enters the automatic parking mode on a ramp and the brake pedal 136 is not stepped on to the predefined position, the walking control module 124 sends a buzzer control command to control the buzzer to send an alarm to remind the user that the riding lawn mower 100 may have sliding hazards. In an example, the walking control module 124 is configured to: after receiving an automatic parking signal, that is, when the riding lawn mower 100 enters the automatic parking mode, if it is determined that the operating parameter of the walking motor is greater than a predefined threshold, control the alarm assembly to issue an alarm. For example, the walking control module determines whether the first current output by the power supply assembly 14 to the walking motor is greater than a predefined current value, and if the first current output by the power supply assembly 14 is greater than the predefined current value, then it is determined that the riding lawn mower 100 is parked on a ramp; check whether the brake pedal 136 is at a predefined position, if the walking control module 124 does not receive a brake signal at this time, then it is determined that the brake pedal 136 is not at the predefined position, thus control the buzzer to issue an alarm. If the first current output by the power supply assembly 14 is less than or equal to the predefined current value, it is determined that the riding lawn mower 100 is parked on a flat ground, and therefore, there is no sliding hazard for the riding lawn mower 100, wherein the first current can be directly detected by the current detection module 29. In another example, the walking control module 124 is configured to: when the riding lawn mower enters the automatic parking mode, determine whether the output torque of the walking motor 123 is greater than a predefined torque threshold; if the output torque of the walking motor 123 is greater than the predefined torque threshold, then it is determined that the riding lawn mower 100 is parked on a ramp; check whether the brake pedal 136 is at a predefined position, if the walking control module 124 does not receive a brake signal at this time, then it is determined that the brake pedal 136 is not at the predefined position, thus control the buzzer to issue an alarm. If the output torque of the walking motor 123 is less than or equal to the predefined torque threshold, it is determined that the riding lawn mower 100 is parked on a flat ground, and therefore, there is no sliding hazard for the riding lawn mower 100.

The alarm assembly 50 also includes a brake indicator light. When the riding lawn mower 100 enters the automatic parking mode and the brake pedal 136 is not stepped on to the predefined position, the walking control module 124 controls the brake indicator light to flash to remind the user that the brake is not properly applied, and the riding lawn mower 100 may have sliding hazards. In an example, when the riding lawn mower 100 enters the automatic parking mode and the brake pedal 136 is not stepped on to the predefined position, the walking control module 124 controls the operation panel 22 to display a predefined image to remind the user that the brake is not properly applied, and the riding lawn mower 100 may have sliding hazards.

In some examples, the riding lawn mower 100 includes a key socket for inserting a key to start the riding lawn mower 100. For example, after the key is inserted into the key socket, and the user triggers the start button or start switch of the operation panel 22, the power supply assembly 14 provides electric power to the cutting motor 112, the walking motor 123, the walking control module 124, and other power consumption modules to make the riding lawn mower operate normally. Optionally, when the key is pulled out of the key socket for more than a predefined time, the riding lawn mower 100 enters the sleep mode.

Figure 19:
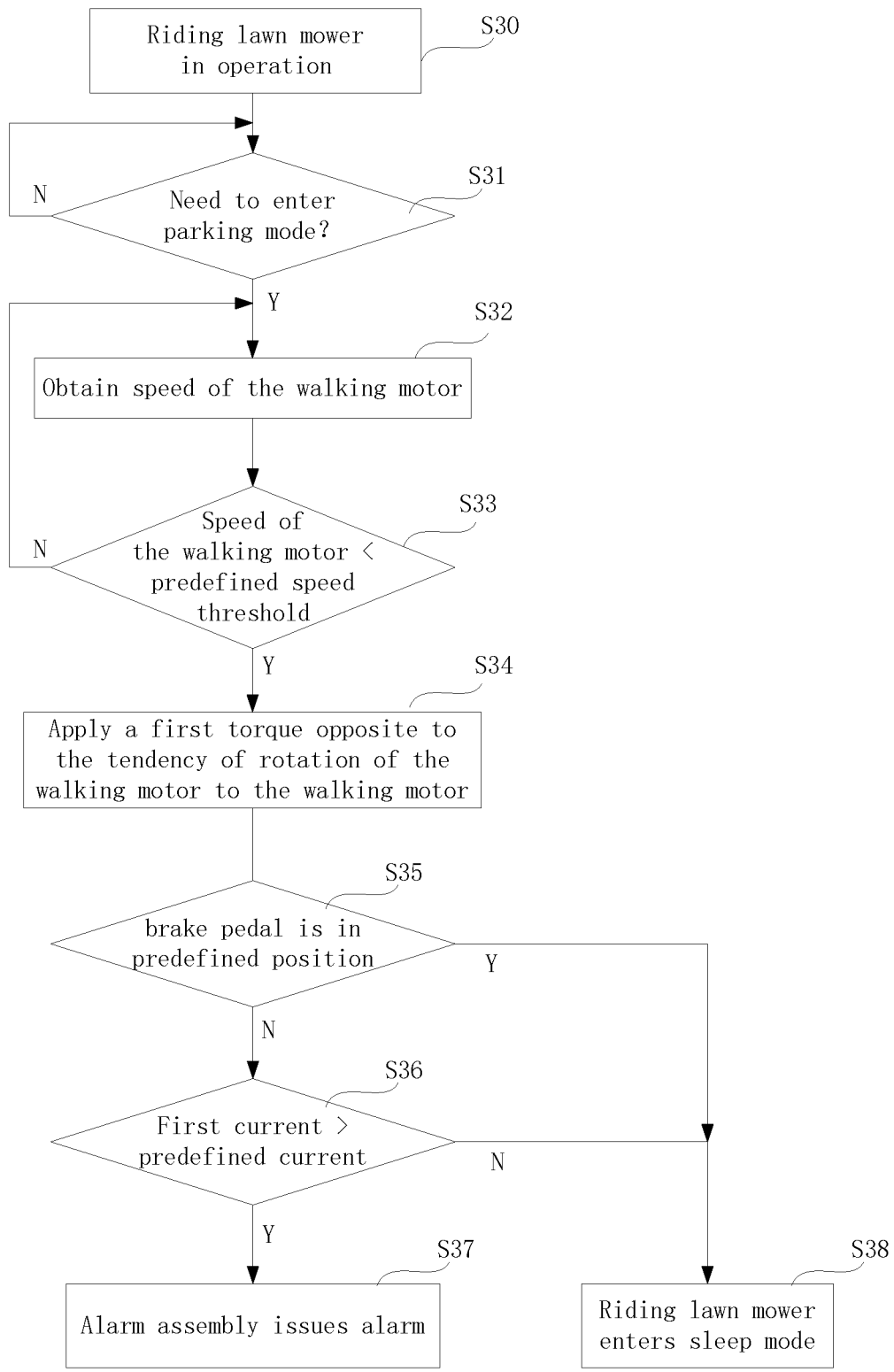
FIG. 19 is a flowchart of a control method of the riding lawn mower according to another example.

Referring to FIG. 19, a control method of the riding lawn mower 100 includes:

Step S30: the riding lawn mower is in operation;

The walking control module 16 controls the riding lawn mower 100 to operate normally. In some examples, after the key is inserted into the key socket, and the user triggers the start button or start switch of the operation panel 22, the power supply assembly 14 provides electric power to the cutting motor 112, the walking motor 123, the walking control module 124, and other power consumption modules to make the riding lawn mower operate normally.

Step S31: determine whether the riding lawn mower needs to enter the automatic parking mode;

For example, when automatic parking is needed, the user sends an automatic parking signal by operating the operating component 13 to trigger the riding lawn mower 100 to enter the automatic parking mode. As described above, in the example using the operating lever 131, the user sends an automatic parking signal to trigger the automatic parking mode by pushing the operating lever 131 to the automatic parking position, and the operation sensing module 132 detects that the operating lever 131 is in the automatic parking position, and sends the detected position information to the walking control module 124, and the walking control module 124 controls the walking motor 123 to realize automatic parking. In the example in which two operating levers respectively control two walking motors 123, the user issues an automatic parking command by pushing both operating levers 131 to the automatic parking position. If the operation sensing module 132 detects the automatic parking signal that the riding lawn mower 100 needs to enter the automatic parking mode, then go to step S32. If the operation sensing module 132 does not detect the automatic parking signal that the riding lawn mower 100 needs to enter the automatic parking mode, the riding lawn mower 100 continues to maintain the operation state.

Step S32: obtain the rotational speed of the walking motor;

When it is determined that the riding lawn mower 100 needs to enter the automatic parking mode, the speed detection module 128 detects the rotational speed of the walking motor and sends it to the walking control module 124, and the walking control module obtains the detected rotational speed of the walking motor 123.

Step S33: determine whether the rotational speed of the walking motor is less than or equal to a predefined speed threshold.

The walking control module 124 compares the rotational speed of the walking motor 123 detected by the speed detection module 128 with a predefined speed threshold to determine whether the rotational speed of the walking motor 123 is less than or equal to the predefined speed threshold. If it is determined that the rotational speed of the walking motor 123 is greater than or equal to the predefined speed threshold, then go to step S32, continue to obtain the rotational speed of the walking motor 123 and determine whether the rotational speed is less than or equal to the predefined speed threshold.

Step S34: apply a first torque that is opposite to the tendency of rotation of the walking motor to the walking motor, wherein the first torque is configured to make the riding lawn mower to stand still in one position.

After determining that the rotational speed of the walking motor 123 is less than or equal to the predefined speed threshold, apply a first torque that is opposite to the tendency of rotation of the walking motor 123 to the walking motor 123. For example, the walking control module 124 outputs a control signal to the drive circuit 127, and the drive circuit 127 adjusts the magnitude and direction of the first current, so that the walking motor 123 generates the first torque. The first torque has equal magnitude and opposite direction to the external force torque of the riding lawn mower 100 that causes the riding lawn mower 100 to have a tendency to slide. The first torque is configured to make the riding lawn mower to stand still in one position.

Step S35: determine whether the brake pedal 136 is at the predefined position.

The walking control module determines whether the brake pedal 136 is at the predefined position according to the brake signal. If it is determined that the brake pedal 136 is not at the predefined position, then go to step S36; if it is determined that the brake pedal 136 is at the predefined position, then go to step S38 to control the riding lawn mower 100 to enter the sleep mode.

Step S36: determine whether the first current output by the power supply assembly to the walking motor is greater than a predefined current value.

The walking control module 124 compares the first current output by the power supply assembly detected by the current detection module 29 with the predefined current value to determine whether the first current value is greater than the predefined current value. If it is determined that the first current is greater than the predefined current value, then go to step S37; if it is determined that the first current is less than or equal to the predefined current value, then go to step S38 to control the riding lawn mower 100 to enter the sleep mode.

Step S37: the alarm assembly issues an alarm.

The walking control module 124 sends an alarm signal to the alarm assembly 50 so that the alarm assembly 50 issues an alarm to remind the user. In an example, the alarm assembly 50 includes at least a buzzer. When the riding lawn mower 100 enters the automatic parking mode on a ramp and the brake pedal 136 is not stepped on to the predefined position, the walking control module 124 controls the buzzer to issue an alarm to remind the user that the riding lawn mower 100 may have sliding hazards. In another example, the alarm assembly 50 further includes an indicator light. When the riding lawn mower enters the automatic parking mode and the brake pedal 136 is not stepped on to the predefined position, the walking control module controls the brake indicator light to flash to remind the user that the brake is not properly applied, and the riding lawn mower 100 may have sliding hazards.

Step S38: the riding lawn mower enters the sleep mode.

After a predefined period of time, the walking control module 124 controls the riding lawn mower to enter the sleep mode. That is, the walking control module 124 sends a sleep signal to the power supply assembly 14 to stop supplying electric energy to the cutting motor 112, the walking motor 123, and other electronic components of the riding lawn mower 100.

What is claimed is:

1. A riding lawn mower, comprising:
   a chassis;
   a power output assembly supported by the chassis and comprising a mowing element, an electric cutting motor for driving the mowing element to move, and a cutting control module for controlling the cutting motor;

a drive assembly comprising a plurality of wheels supporting the chassis, an electric drive motor for driving at least one of the plurality of wheels to travel, and a drive control module for controlling the drive motor;
a first operating component supported by the chassis and coupled to the drive assembly to cause the drive motor to operate; and
the first operating component configured to set a plurality of accelerating modes of the drive motor in response to operation of the first operating component, the first operating component having:
  a first operating state configured to start the drive motor in a first starting mode, wherein in the first starting mode, the drive motor accelerates at a first starting acceleration in response to operation of the first operating component in a first manner; and
  a second operating state configured to start the drive motor in a second starting mode, wherein in the second starting mode, the drive motor accelerates at a second starting acceleration in response to operation of the first operating component in the first manner,
wherein the second starting acceleration is greater than the first starting acceleration,
wherein the first operating component is further configured to send a parking signal to trigger the riding lawn mower to enter a parking mode, and
wherein the drive control module is configured to:
  in response to the parking signal, determine whether a rotational speed of the drive motor is less than or equal to a predefined speed threshold;
  after determining that the rotational speed of the drive motor is less than or equal to the predefined speed threshold, apply a first torque opposite to a tendency of rotation of the drive motor to the drive motor, and the first torque is configured to enable the riding lawn mower to stand still in a position.

2. The riding lawn mower of claim 1, wherein the first operating component further has:
  a third operating state configured to start the drive motor in a third starting mode, and in the third starting mode, the drive motor accelerates at a third starting acceleration in response to operation of the first operating component in the first manner;
  wherein the third starting acceleration is greater than the second starting acceleration.

3. A riding lawn mower, comprising:
a chassis;
a power output assembly supported by the chassis and comprising a mowing element, an electric cutting motor for driving the mowing element to move, and a cutting control module for controlling the cutting motor;
a drive assembly comprising a plurality of wheels supporting the chassis, an electric drive motor for driving at least one of the plurality of wheels to travel, and a drive control module for controlling the drive motor;
a first operating component supported by the chassis and coupled to the drive assembly to cause the drive motor to operate; and
the first operating component configured to set a plurality of accelerating modes of the drive motor in response to operation of the first operating component, the first operating component having:
  a first operating state configured to start the drive motor in a first starting mode, wherein in the first starting mode, the drive motor accelerates at a first starting acceleration in response to operation of the first operating component in a first manner; and
  a second operating state configured to start the drive motor in a second starting mode, wherein in the second starting mode, the drive motor accelerates at a second starting acceleration in response to operation of the first operating component in the first manner,
wherein the second starting acceleration is greater than the first starting acceleration;
a power supply assembly configured to provide electric energy for the drive motor;
when the power supply assembly supplies a first amount of power, the drive motor accelerates at the first starting acceleration in the first starting mode, and the drive motor accelerates at the second starting acceleration in the second starting mode;
when the power supply assembly supplies a second amount of power, the drive motor accelerates at a third starting acceleration in the first starting mode, and the drive motor accelerates at a fourth starting acceleration in the second starting mode;
wherein the first starting acceleration is different from the third starting acceleration, and the second starting acceleration is different from the fourth starting acceleration.

4. The riding lawn mower of claim 1, further comprising:
a second operating component supported by the chassis and coupled to the drive assembly to cause the drive motor to operate and configured to send a start signal to start the drive motor;
wherein the drive control module is configured to:
in response to the start signal, accelerate the drive motor according to the starting mode corresponding to the operating state of the first operating component.

5. The riding lawn mower of claim 1, wherein the first operating component is also configured to set a plurality of braking modes of the drive motor; the first operating component also has:
  a fourth operating state configured to brake the drive motor in a first braking mode, and in the first braking mode, the drive motor brakes with a first braking acceleration; and
  a fifth operating state configured to brake the drive motor in a second braking mode, and in the second braking mode, the drive motor brakes with a second braking acceleration;
wherein the second braking acceleration is different from the first braking acceleration.

6. The riding lawn mower of claim 5, further comprising:
a second operating component configured to send a brake signal to brake the drive motor;
wherein the drive control module is configured to:
in response to a start signal, start the drive motor according to the starting mode corresponding to the operating state of the first operating component;
in response to the brake signal, brake the drive motor according to the braking mode corresponding to the operating state of the first operating component.

7. The riding lawn mower of claim 1, wherein the first torque and a torque of an external force of the riding lawn mower that causes the riding lawn mower to have a tendency to slide are of a same magnitude and opposite directions.

8. The riding lawn mower of claim 1, wherein the drive control module is configured to:
in response to the rotational speed of the drive motor being less than or equal to the predefined speed threshold, control a power supply assembly to output a first current to the drive motor, and the first current enables the drive motor to generate the first torque.

9. The riding lawn mower of claim 8, wherein the drive motor comprises a rotor, the riding lawn mower further comprises a rotor position detection module configured to detect a position of the rotor of the drive motor, and the drive control module is configured to:
   in response to the rotational speed of the drive motor being less than or equal to the predefined speed threshold, select a current position of the rotor of the drive motor as a reference position;
   in response to a state in which the rotor deviates from the reference position, control the power supply assembly to output the first current to the drive motor so that the drive motor generates the first torque, and the first torque makes the rotor of the drive motor return to the reference position.

10. The riding lawn mower of claim 1, wherein the second operating component is further configured to send an acceleration signal to trigger the riding lawn mower to exit the parking mode, and the drive control module is configured to:
    in response to the acceleration signal, determine whether a direction of a second torque to be generated by the drive motor corresponding to the acceleration signal is the same as a direction of the first torque;
    if the direction of the second torque is the same as the direction of the first torque, then determine whether the second torque is greater than or equal to the first torque;
    if the second torque is greater than or equal to the first torque, control the riding lawn mower to exit the parking mode;
    if the direction of the second torque is opposite to the direction of the first torque, control the riding lawn mower to exit the parking mode.

11. The riding lawn mower of claim 10, wherein the second operating component is further configured to set a target speed and direction of the drive motor, and the drive control module is configured to:
    in response to an end of the parking mode, control the drive motor to run at the target speed and direction according to the target speed and direction set by the second operating component.

12. The riding lawn mower of claim 1, further comprising:
    a detection device for detecting an operating parameter of the drive motor when the riding lawn mower is in the parking mode;
    a brake assembly for at least mechanical braking to prevent the drive wheel from moving relative to the chassis, wherein the brake assembly outputs a brake signal when triggered by a user; and
    an alarm assembly configured to issue an alarm to remind the user;
    wherein the drive control module is configured to:
    receive the parking signal to make the riding lawn mower in the parking mode;
    when the riding lawn mower is in the parking mode and the brake signal is not received, determine whether the operating parameter of the drive motor is greater than a predefined threshold value;
    if the operating parameter of the drive motor is greater than the predefined threshold value, control the alarm assembly to issue an alarm.

13. The riding lawn mower of claim 12, wherein the drive control module is configured to:
    in response to the alarm assembly issuing an alarm, determine whether the brake signal is received; and
    in response to the received brake signal, control the alarm assembly to dismiss the alarm.

14. The riding lawn mower of claim 12, wherein the drive control module is configured to:
    determine whether the riding lawn mower is in the parking mode for a time greater than or equal to a predefined period of time;
    in response to the riding lawn mower being in the parking mode for a time greater than or equal to the predefined period of time, and the brake signal is received, control the riding lawn mower to enter a sleep mode.

15. The riding lawn mower of claim 12, wherein the brake assembly comprises:
    a brake pedal for the user to step on;
    a signal switch coupled with the brake pedal to be locked and output the brake signal when the brake pedal is stepped on to a predefined position.

16. The riding lawn mower of claim 12, wherein the detection device is configured to detect an output torque of the drive motor of the riding lawn mower in the parking mode, and the drive control module is configured to:
    determine whether the riding lawn mower is in the parking mode;
    in response to the riding lawn mower in the parking mode, and the brake signal is not received, determine if the output torque of the drive motor is greater than a predefined torque threshold;
    if the torque of the drive motor is greater than the predefined torque threshold, control the alarm assembly to issue an alarm.

17. The riding lawn mower of claim 1, further comprising:
    a third operating component supported by the chassis and configured to make the riding lawn mower enter a ready state, wherein the third operating component comprises:
    a first trigger configured to power on the cutting control module; and
    a second trigger configured to enable the drive motor to be started;
    wherein the drive control module is configured to:
    in response to the first trigger being triggered and the second trigger being triggered, control the drive motor to start.

18. The riding lawn mower of claim 17, wherein the drive control module is configured to:
    during a drive process of the riding lawn mower, if the first trigger is not triggered, control the drive motor to power off, or control the drive motor to brake and then power off.

19. The riding lawn mower of claim 17, wherein the drive control module is configured to:
    during a drive process of the riding lawn mower, if the second trigger is triggered, control the drive motor to remain in a current state, or control the drive motor to power off, or control the drive motor to brake and then power off.

* * * * *